United States Patent
Ohnishi et al.

(10) Patent No.: US 11,113,027 B2
(45) Date of Patent: Sep. 7, 2021

(54) APPARATUS, SYSTEM, AND METHOD THAT SUPPORT OPERATION TO SWITCH TO INPUT TERMINAL TO BE ACTIVATED AMONG INPUT TERMINALS INCLUDED IN DISPLAY APPARATUS

(71) Applicant: SHARP KABUSHIKI KAISHA, Sakai (JP)

(72) Inventors: Akinori Ohnishi, Sakai (JP); Hiroki Munetomo, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 136 days.

(21) Appl. No.: 16/233,742

(22) Filed: Dec. 27, 2018

(65) Prior Publication Data

US 2019/0205090 A1 Jul. 4, 2019

(30) Foreign Application Priority Data

Dec. 28, 2017 (JP) .............................. JP2017-253528
May 28, 2018 (JP) .............................. JP2018-101537

(51) Int. Cl.
*G06F 3/16* (2006.01)
*G10L 15/08* (2006.01)
*G10L 15/26* (2006.01)

(52) U.S. Cl.
CPC .............. *G06F 3/167* (2013.01); *G10L 15/08* (2013.01); *G10L 15/26* (2013.01); *G10L 2015/088* (2013.01)

(58) Field of Classification Search
CPC ... G10L 2015/223; G10L 15/26; G10L 15/08; G06F 3/167
See application file for complete search history.

(56) References Cited

U.S. PATENT DOCUMENTS

| | | | |
|---|---|---|---|
| 9,288,421 B2 | 3/2016 | Cha et al. | |
| 9,996,310 B1* | 6/2018 | Bliss | G06F 3/167 |
| 10,178,218 B1* | 1/2019 | Vadodaria | G06F 40/30 |
| 10,198,877 B1* | 2/2019 | Maltsev | G10L 15/26 |
| 10,558,417 B1* | 2/2020 | Bliss | G06F 16/9566 |
| 10,827,028 B1* | 11/2020 | Bromand | G10L 15/08 |
| 2014/0019140 A1 | 1/2014 | Cha et al. | |
| 2015/0254058 A1* | 9/2015 | Klein | G06F 3/167 704/275 |
| 2016/0189717 A1* | 6/2016 | Kannan | G06F 3/167 704/275 |
| 2019/0034542 A1* | 1/2019 | Ming | G10L 15/22 |

FOREIGN PATENT DOCUMENTS

JP 2014-021493 A 2/2014

* cited by examiner

*Primary Examiner* — Matthew H Baker
(74) *Attorney, Agent, or Firm* — ScienBiziP, P.C.

(57) ABSTRACT

An operational support apparatus includes a speech recognizer and a command generator. The speech recognizer converts speech data into text information. In a case where the text information contains a keyword that indicates application software, the command generator identifies which of input terminals of a display apparatus is associated with the application software. The command generator generates, as a control command, a switching command to activate the input terminal thus identified and a start-up command to start the application software.

13 Claims, 21 Drawing Sheets

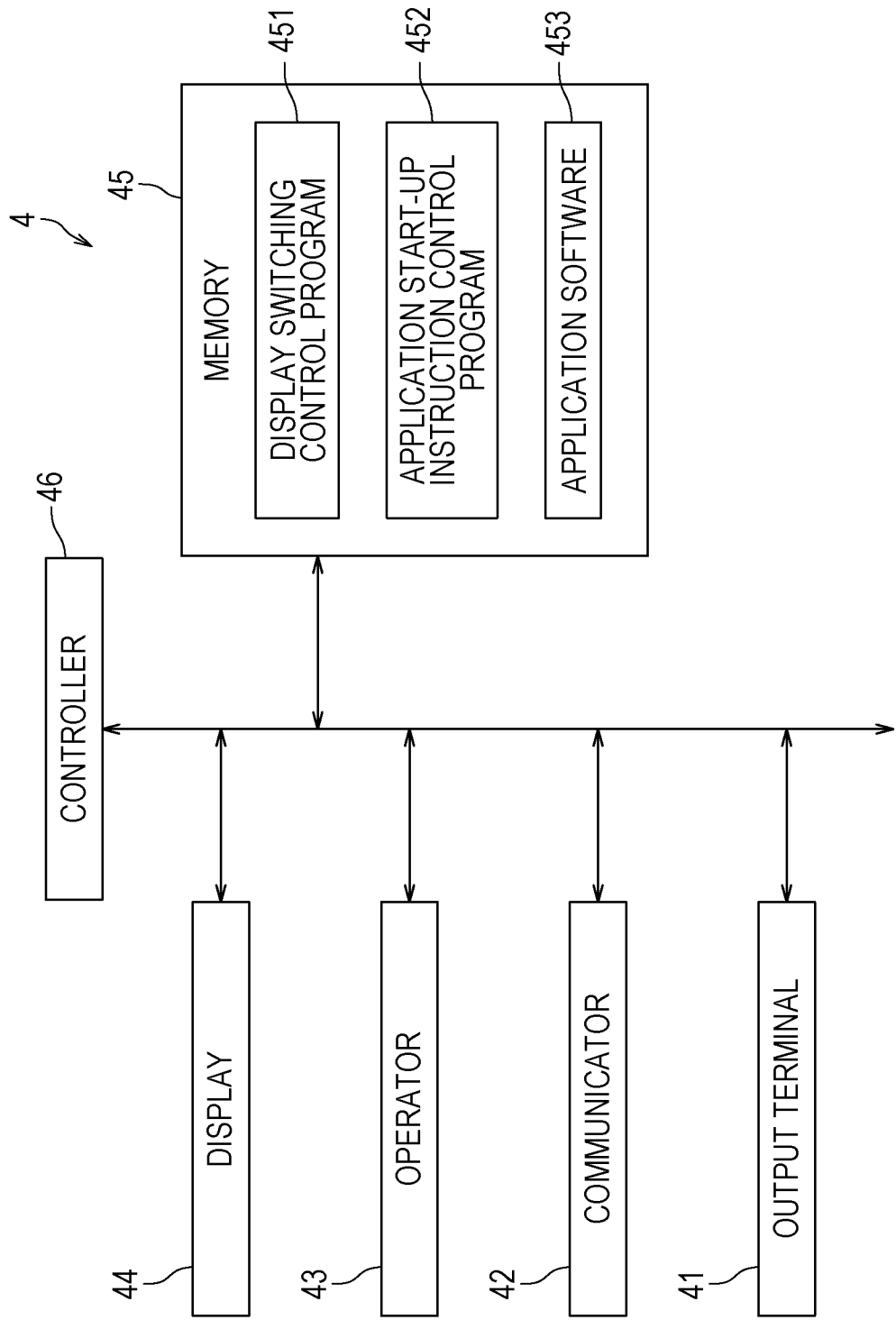

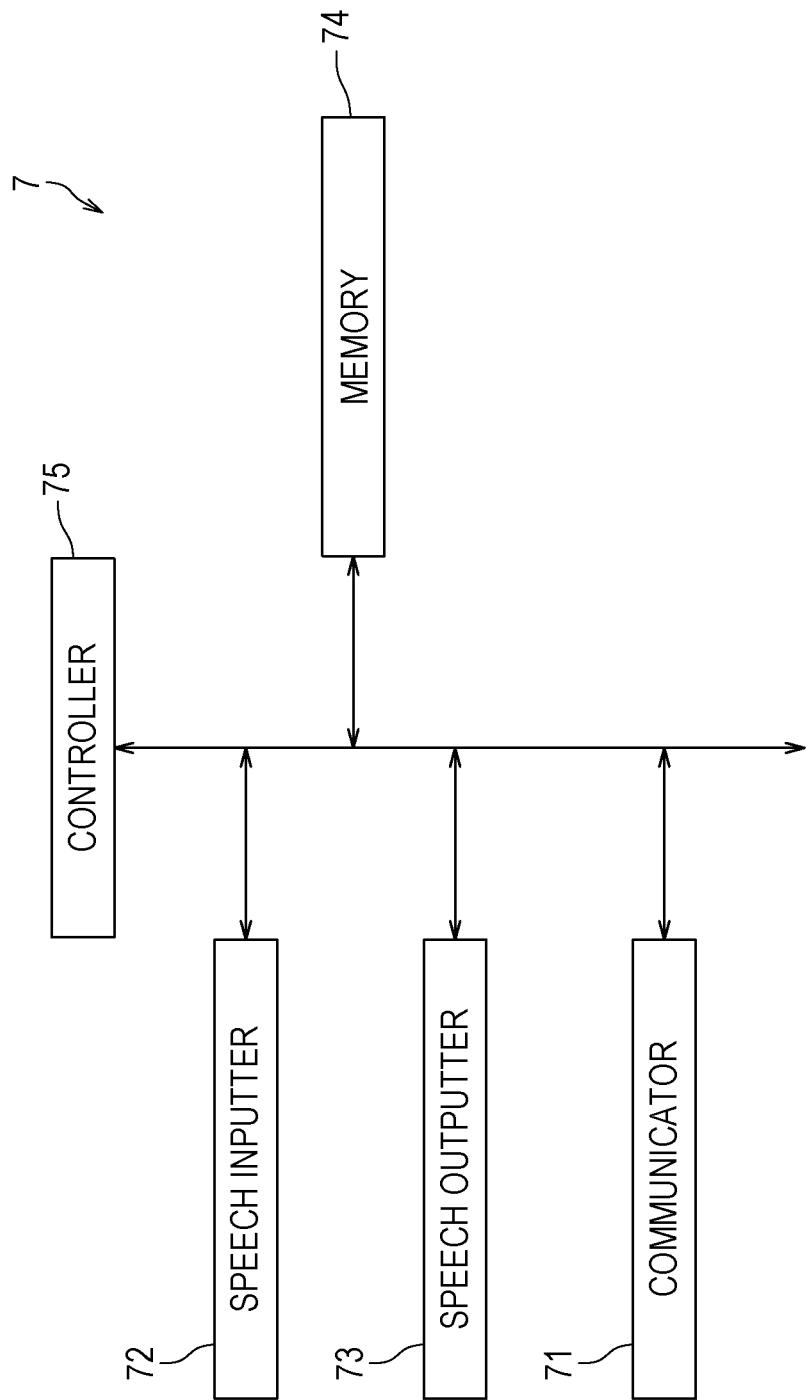

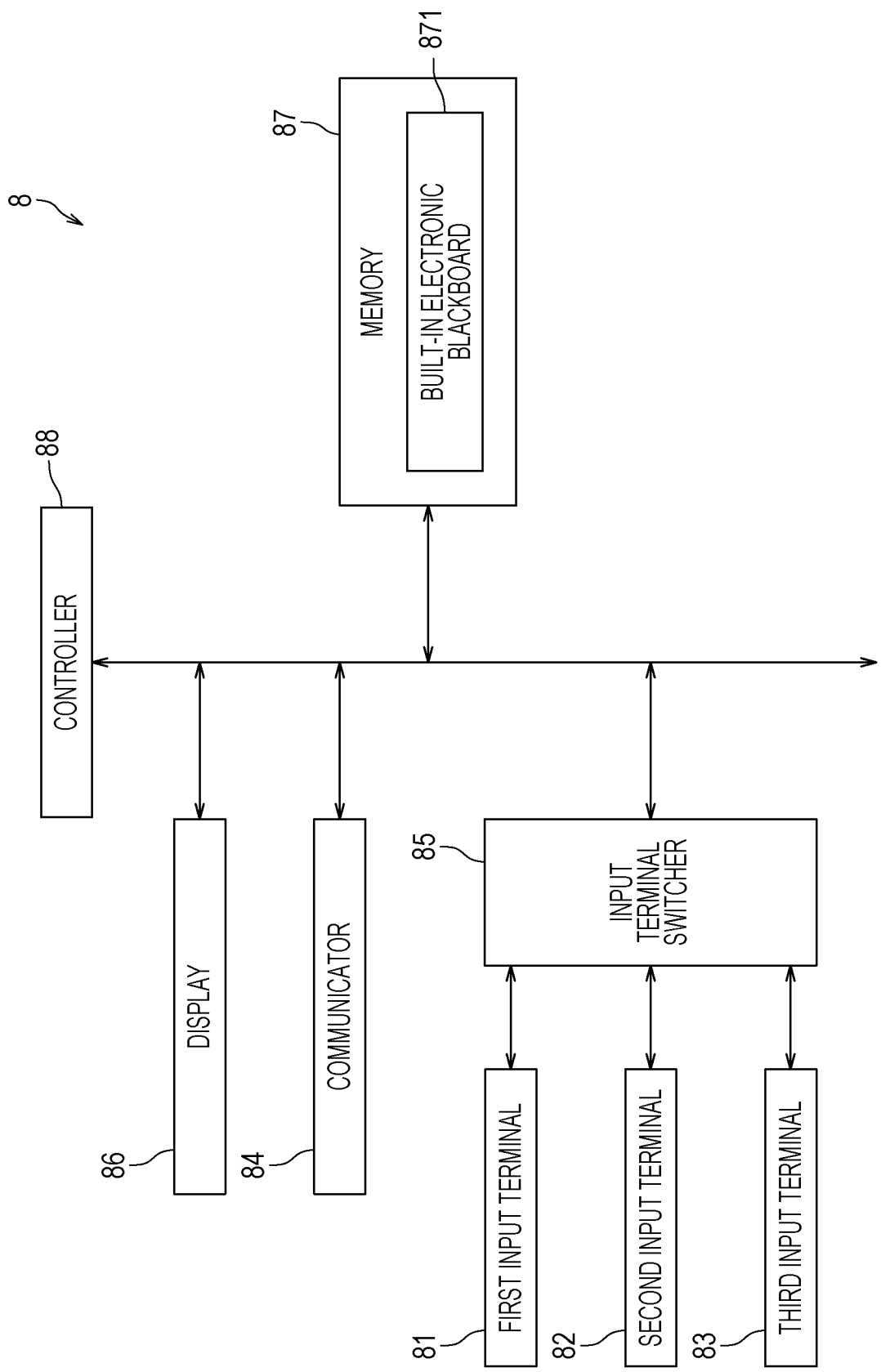

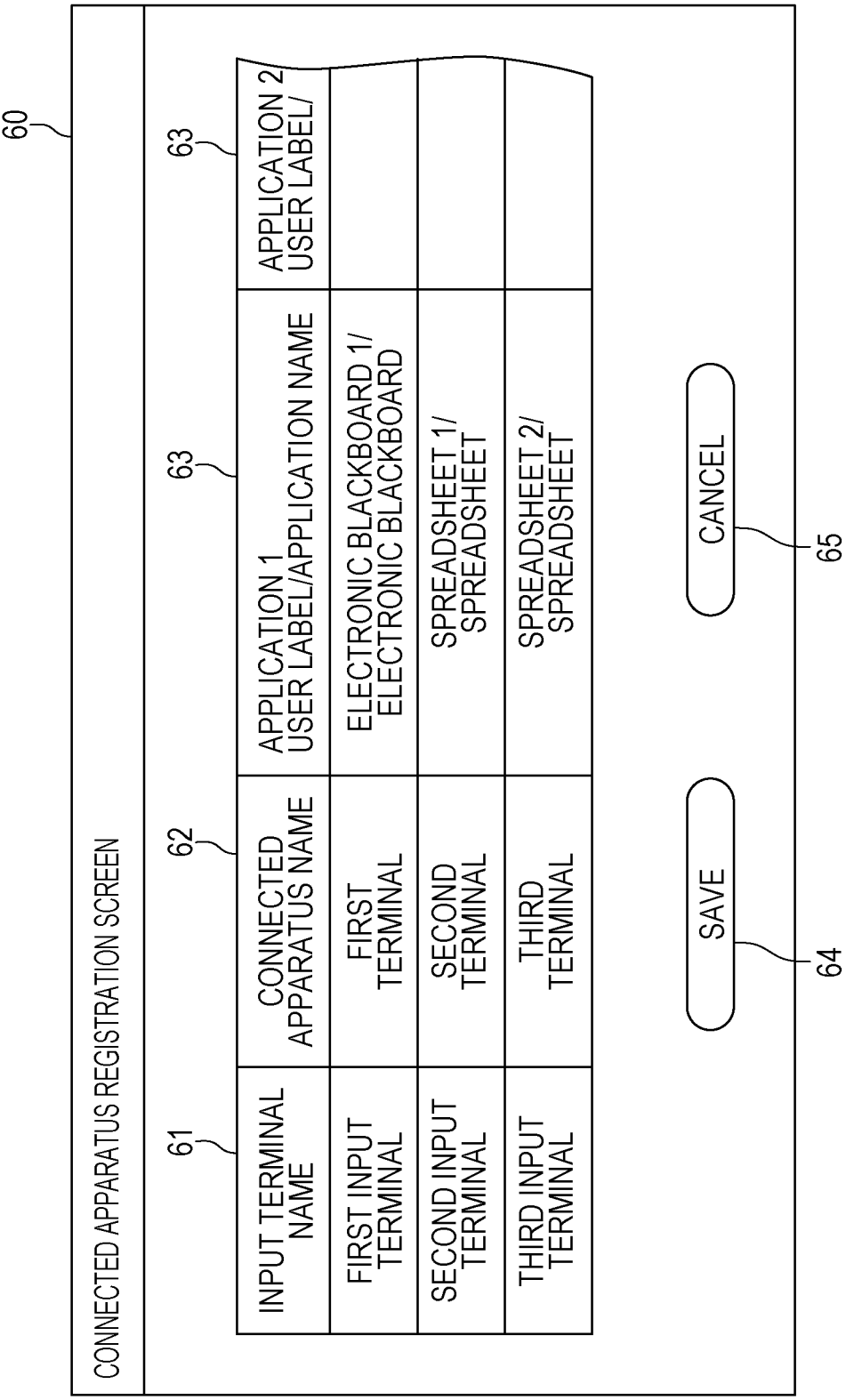

| DISPLAY APPARATUS ID | FIRST TAG | SECOND TAG | APPLICATION |
|---|---|---|---|
| xxxxx | FIRST INPUT TERMINAL | FIRST TERMINAL | APPLICATION TABLE 1 |
| | SECOND INPUT TERMINAL | SECOND TERMINAL | APPLICATION TABLE 2 |
| | THIRD INPUT TERMINAL | THIRD TERMINAL | APPLICATION TABLE 3 |
| | ELECTRONIC BLACKBOARD | ELECTRONIC BLACKBOARD 1 | BUILT-IN ELECTRONIC BLACKBOARD |

| START-UP COMMAND | APPLICATION TAG | USER LABEL TAG |
|---|---|---|
| exeaaaa | ELECTRONIC BLACKBOARD | ELECTRONIC BLACKBOARD 2 |

| DISPLAY APPARATUS ID | DEFAULT SETTING TERMINAL | CURRENT DISPLAY | LAST DISPLAY |
|---|---|---|---|
| xxxxx | FIRST INPUT TERMINAL | FIRST INPUT TERMINAL | THIRD INPUT TERMINAL |

FIG. 21

| DISPLAY APPARATUS ID | FIRST TAG | SECOND TAG | APPLICATION | DATA FILE NAME |
|---|---|---|---|---|
| xxxxx | FIRST INPUT TERMINAL | FIRST TERMINAL | APPLICATION TABLE 1 | 1111.xxx |
| | SECOND INPUT TERMINAL | SECOND TERMINAL | APPLICATION TABLE 2 | 2222.yyy |
| | THIRD INPUT TERMINAL | THIRD TERMINAL | APPLICATION TABLE 3 | 3333.zzz |
| | ELECTRONIC BLACKBOARD | ELECTRONIC BLACKBOARD 1 | BUILT-IN ELECTRONIC BLACKBOARD | |

APPARATUS, SYSTEM, AND METHOD THAT SUPPORT OPERATION TO SWITCH TO INPUT TERMINAL TO BE ACTIVATED AMONG INPUT TERMINALS INCLUDED IN DISPLAY APPARATUS

BACKGROUND

1. Field

The present disclosure relates to an operational support apparatus, an operational support system, and an operational support method that support a user in operating a display apparatus.

2. Description of the Related Art

Japanese Unexamined Patent Application Publication No. 2014-021493 discloses a broadcast reception apparatus that utilizes speech recognition technology to support a user's operation. The broadcast reception apparatus disclosed in Japanese Unexamined Patent Application Publication No. 2014-021493 activates an external input terminal to which an external input device corresponding to a user's speech is connected, and displays a picture that is received from the external input device corresponding to the user's speech. Specifically, the broadcast reception apparatus disclosed in Japanese Unexamined Patent Application Publication No. 2014-021493 includes external input terminals, a call word setter, a storage, a speech recognizer, a controller, and a display. Further, the broadcast reception apparatus is communicably connected to a server.

External input devices are connected to the external input terminals. The call word setter sets call words for the external input devices. The storage has stored therein a matching of a call word and an external input terminal to which an external input device corresponding to the call word is connected. The speech recognizer converts a user's speech into a digital signal and transmits the digital signal to the server. The server generates, on the basis of the digital signal, text information corresponding to the user's speech.

The controller determines, on the basis of the text information received from the server, whether the user's speech contains the call word, and in a case where the user's speech contains the call word, the controller activates the external input terminal corresponding to the call word, and controls the display so that the display displays a picture that the external input terminal corresponding to the call word receives. Examples of call words disclosed in Japanese Unexamined Patent Application Publication No. 2014-021493 are "video", "DVD", and "Blu-ray".

However, the broadcast reception apparatus disclosed in Japanese Unexamined Patent Application Publication No. 2014-021493 is not configured such that in a case where a terminal apparatus (e.g. a personal computer) installed with application software is connected to a display apparatus, image information that is generated by the application software can be displayed on the display apparatus in accordance with a user's speech.

It is desirable to provide an operational support apparatus, an operational support system, and an operational support method that make it possible that in a case where a terminal apparatus connected to a display apparatus is installed with application software, image information that is generated by the application software can be displayed in accordance with a user's speech.

SUMMARY

According to an aspect of the disclosure, there is provided an operational support apparatus for supporting operation of a display apparatus. The operational support apparatus includes a speech recognizer and a command generator. The speech recognizer converts speech data into text information. The command generator generates a control command that corresponds to a content of the text information. Further, in a case where the text information contains a keyword that indicates application software, the command generator identifies which of input terminals of the display apparatus is associated with the application software. The command generator generates, as the control command, a switching command to activate the input terminal thus identified and a start-up command to start the application software.

According to an aspect of the disclosure, there is provided an operational support system including a display apparatus and an operational support apparatus for supporting operation of the display apparatus. The operational support apparatus includes a speech recognizer and a command generator. The speech recognizer converts speech data into text information. The command generator generates a control command that corresponds to a content of the text information. Further, in a case where the text information contains a keyword that indicates application software, the command generator identifies which of input terminals of the display apparatus is associated with the application software. The command generator generates, as the control command, a switching command to activate the input terminal thus identified and a start-up command to start the application software. The display apparatus displays image information received by the input terminal activated by the switching command.

According to an aspect of the disclosure, there is provided an operational support method for supporting operation of a display apparatus. The operational support method includes recognizing speech whose speech data is converted into text information, generating a control command that corresponds to a content of the text information, and displaying image information. The generating the command includes, in a case where the text information contains a keyword that indicates application software, identifying which of input terminals of the display apparatus is associated with the application software, and generating, as the control command, a switching command to activate the input terminal thus identified and a start-up command to start the application software. The displaying includes displaying image information received by the input terminal activated by the switching command.

BRIEF DESCRIPTION OF THE DRAWINGS

FIG. 3 is a diagram showing a configuration of a first terminal apparatus according to Embodiment 1 of the present disclosure;

FIG. 4 is a diagram showing a configuration of a microphone/speaker apparatus according to Embodiment 1 of the present disclosure;

FIG. 5 is a diagram showing a configuration of a display apparatus according to Embodiment 1 of the present disclosure;

FIG. 6 is a diagram showing a connected apparatus registration screen according to Embodiment 1 of the present disclosure;

FIG. 7A is a diagram showing a first management table according to Embodiment 1 of the present disclosure;

FIG. 7B is a diagram showing an application table according to Embodiment 1 of the present disclosure;

FIG. 11 is a diagram showing a second management table according to Embodiment 1 of the present disclosure;

FIG. 21 is a diagram showing a first management table according to Embodiment 2 of the present disclosure;

DESCRIPTION OF THE EMBODIMENTS

Figure 1:
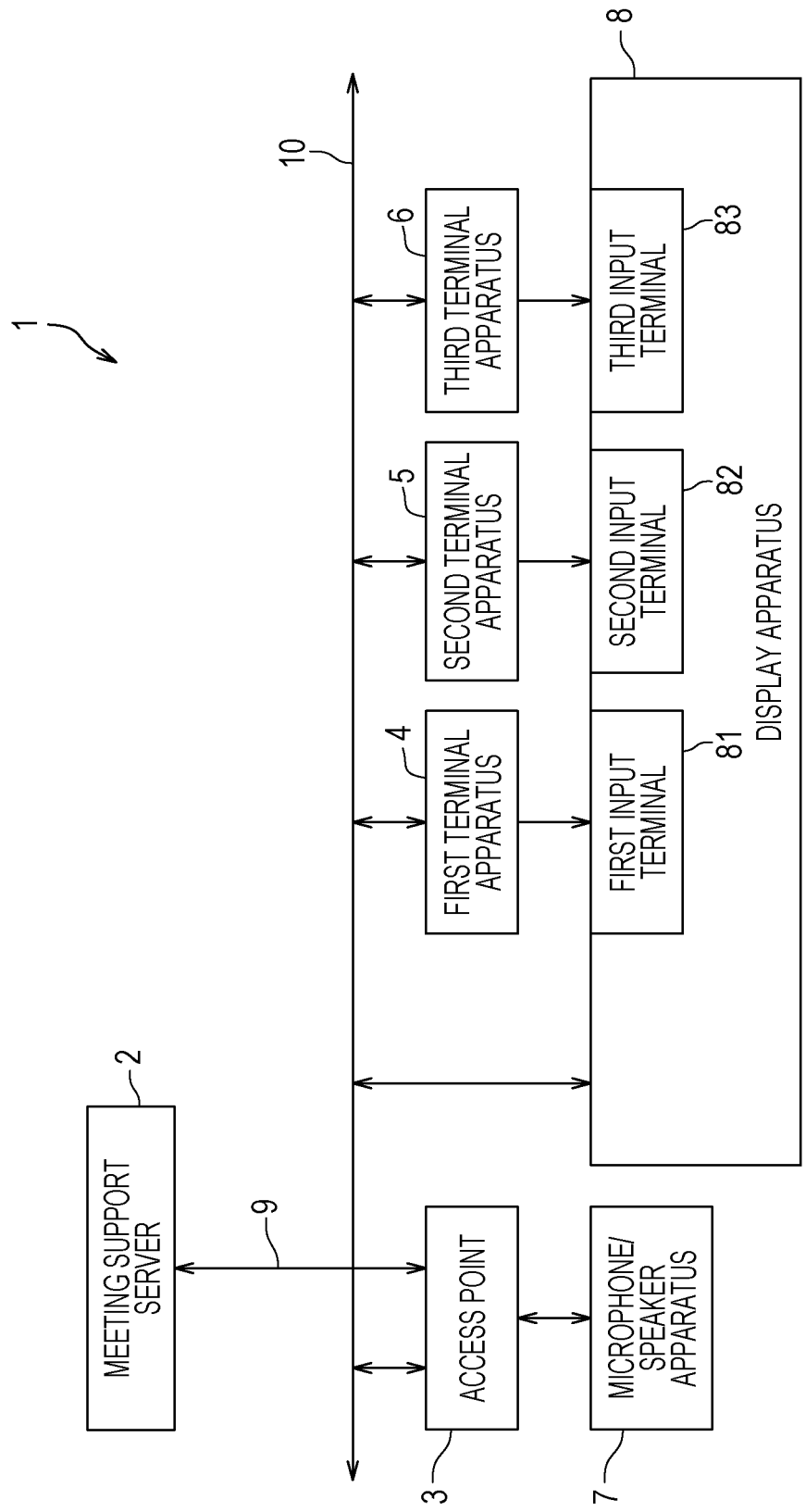
FIG. 1 is a diagram showing a meeting system according to Embodiment 1 of the present disclosure.

The following describes embodiments of the present disclosure with reference to the drawings. Note, however, that the present disclosure is not limited to the following embodiments. In the drawings, identical or equivalent components are given the same reference signs and are not repeatedly described. Further, where a description is redundant, the description may be omitted as appropriate.

Embodiment 1

FIG. 1 is a diagram showing a meeting system 1 according to Embodiment 1. The meeting system 1 is used for a meeting. The meeting system 1 is an example of an operational support system. As shown in FIG. 1, the meeting system 1 includes a meeting support server 2, an access point 3, first to third terminal apparatuses 4 to 6, a microphone/speaker apparatus 7, and a display apparatus 8.

In Embodiment 1, the meeting support server 2 is an example of an operational support apparatus, and supports operation of the display apparatus 8. Specifically, in a case where the sounds of speech that a user has produced contains a predetermined keyword, the meeting support server 2 switches the display apparatus 8 from one display screen to another in accordance with the sounds of speech that the user has produced. In the following description, the sounds of speech that a user has produced are sometimes referred to as "user's speech".

The access point 3 connects an internet line 9 and a LAN (local area network) cable 10 to each other. To the LAN cable 10, the first to third terminal apparatuses 4 to 6 and the display apparatus 8 are connected. The meeting support server 2 performs communication with the first terminal apparatus 4 via the internet line 9, the access point 3, and the LAN cable 10.

The access point 3 is connected to the microphone/speaker apparatus 7 via a wireless LAN. The meeting support server 2 performs communication with the microphone/speaker apparatus 7 via the internet line 9, the access point 3, and the wireless LAN.

The access point 3 may be connected to the first terminal apparatus 4 via the wireless LAN or may be connected to the microphone/speaker apparatus 7 via the LAN cable 10.

The first to third terminal apparatuses 4 to 6 are connected to the display apparatus 8 and output image information to the display apparatus 8. The first terminal apparatus 4 performs communication with the second terminal apparatus 5, the third terminal apparatus 6, and the display apparatus 8 via the LAN cable 10. The first terminal apparatus 4 may also perform communication with the second terminal apparatus 5, the third terminal apparatus 6, and the display apparatus 8 via the wireless LAN.

The first terminal apparatus 4 is not limited to a particular terminal apparatus, provided it can output image information. In Embodiment 1, the first terminal apparatus 4 is a meeting room PC (personal computer), and is capable of application software implementation. As the meeting room PC, a general-purpose personal computer can be used.

The second and third terminal apparatuses 5 and 6 are not limited to particular terminal apparatuses, provided they can output image information. The second and third terminal apparatuses 5 and 6 may for example be apparatuses that output video information acquired from an external server via the internet line 9. Alternatively, the second and third terminal apparatuses 5 and 6 may be general-purpose personal computers, video cameras, DVD playback apparatuses, or Blu-ray playback apparatuses. In Embodiment 1, the second and third terminal apparatuses 5 and 6 are guest PCs, and are capable of application software implementation.

Examples of application software that is installed on the first to third terminal apparatuses 4 to 6 are electronic blackboard software, spreadsheet software, word-processing software, teleconference software, webconference software, videoconference software, and presentation software.

The microphone/speaker apparatus 7, which is an example of a sound-collecting apparatus, collects the sounds of speech that a user has produced, converts the sounds thus collected into speech data (digital data), and transmits the speech data (digital data) to the meeting support server 2. Further, the microphone/speaker apparatus 7 outputs sounds of speech on the basis of speech data (digital data) received from the meeting support server 2.

The display apparatus 8 displays image information. Specifically, the display apparatus 8 includes first to third input terminals 81 to 83. To the first to third input terminals 81 to 83, apparatuses that are capable of outputting image information are connected. The first to third input terminals 81 to 83 are for example D-SUB terminals, HDMI (registered trademark) terminals, or DisplayPorts.

In Embodiment 1, the first terminal apparatus 4 is connected to the first input terminal 81. The second terminal apparatus 5 is connected to the second input terminal 82. The third terminal apparatus 6 is connected to the third input terminal 83. The display apparatus 8 activates any of the first to third input terminals 81 to 83 and displays image information received by that one of the first to third input terminals 81 to 83 which has been activated. For example, in a case where the first input terminal 81 has been activated, image information that the first input terminal 81 receives from the first terminal apparatus 4 is displayed.

Figure 2:
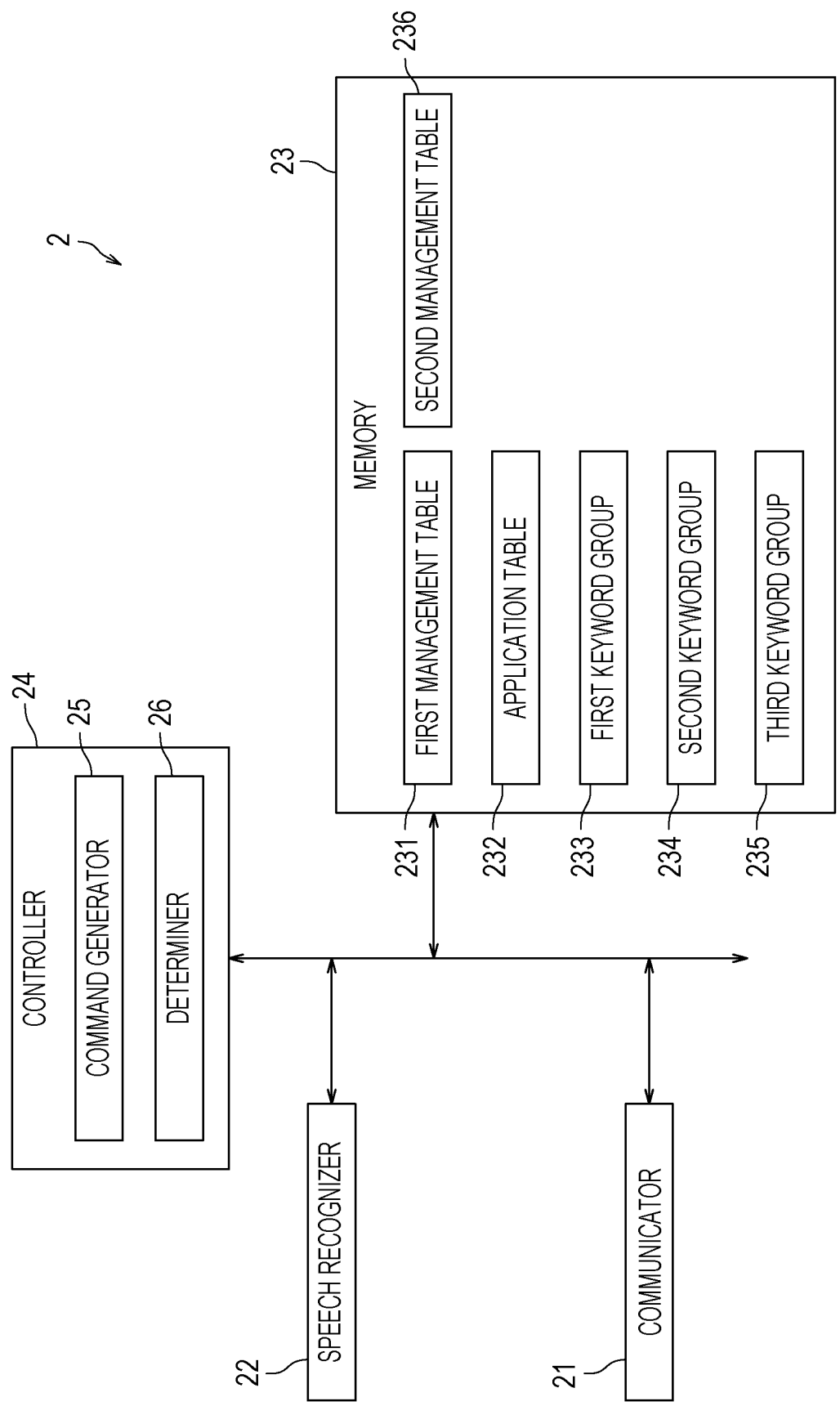
FIG. 2 is a diagram showing a configuration of a meeting support server according to Embodiment 1 of the present disclosure.

Next, a configuration of the meeting support server 2 is described with reference to FIGS. 1 and 2. FIG. 2 is a diagram showing a configuration of the meeting support server 2. As shown in FIG. 2, the meeting support server 2 includes a communicator 21, a speech recognizer 22, a memory 23, and a controller 24.

The communicator 21 is connected to the internet line 9 (FIG. 1). For example, the communicator 21 includes a LAN board or a LAN module. The communicator 21 controls communication with the first terminal apparatus 4 (FIG. 1) and the microphone/speaker apparatus 7 (FIG. 1).

The speech recognizer 22 receives speech data from the microphone/speaker apparatus 7 (FIG. 1) and converts the speech data into text information (hereinafter sometimes referred to as "recognition result text") by means of speech recognition technology. The speech recognizer 22 includes, for example, a speech recognition LSI (large-scale integrated circuit).

The memory 23 includes, for example, a semiconductor memories such as a RAM (random-access memory) and a ROM (read-only memory). Furthermore, the memory 23 includes a storage device such as an HDD (hard disk drive). The memory 23 has stored therein a control program that the controller 24 executes.

In Embodiment 1, the memory 23 has stored therein a first management table 231, an application table 232, a first keyword group 233, a second keyword group 234, a third keyword group 235, and a second management table 236.

The first management table 231 and the application table 232 associate first application software installed on the first to third terminal apparatuses 4 to 6 (FIG. 1), the apparatuses that are connected to the first to third input terminals 81 to 83 (FIG. 1), and the first to third input terminals 81 to 83 (FIG. 1) with one another. The first application software is hereinafter sometimes referred to as "external application".

The first management table 231 further associates the display apparatus 8 (FIG. 1) and second application software installed on the display apparatus 8 (FIG. 1) with each other. The second application software is hereinafter sometimes referred to as "internally-stored application". An example of the internally-stored application is electronic blackboard software stored in a memory 87 of the display apparatus 8 shown in FIG. 5.

The first keyword group 233 includes keywords that indicate the apparatuses that are connected to the first to third input terminals 81 to 83 (FIG. 1), respectively. In Embodiment 1, the first keyword group 233 includes keywords that indicate the first to third terminal apparatuses 4 to 6 (FIG. 1), respectively. The second keyword group 234 includes a keyword that takes the display apparatus 8 (FIG. 1) back to the last display screen it displayed. The third keyword group 235 includes keywords that indicate pieces of application software installed on the first to third terminal apparatuses 4 to 6 (FIG. 1) and the display apparatus 8 (FIG. 1), respectively. The second management table 236 indicates a history (history information) of display screens that the display apparatus 8 (FIG. 1) displayed.

The controller 24 includes, for example, a processor such as a CPU (central processing unit) or an MPU (microprocessing unit). Further, the controller 24 (computer) controls, in accordance with the control program (computer program) stored in the memory 23, how the meeting support server 2 operates. In Embodiment 1, the controller 24 executes the control program to function as a command generator 25 and a determiner 26.

The command generator 25 generates a control command that corresponds to the content of a recognition result text. The determiner 26 determines whether a recognition result text contains a keyword that indicates any of the external applications and the internally-stored application, a keyword that indicates any of the apparatuses that are connected to the first to third input terminals 81 to 83 (FIG. 1), or a keyword that takes the display apparatus 8 (FIG. 1) back to the last display screen it displayed.

In particular, the determiner 26 determines, with reference to the first to third keyword groups 233 to 235, whether a keyword contained in a recognition result text corresponds to a keyword that belongs to the first keyword group 233, a keyword that belongs to the second keyword group 234, or a keyword that belongs to the third keyword group 235. The command generator 25 executes, according to a result of determination yielded by the determiner 26, first to fourth control command generation processes described below.

First Control Command Generation Process

In a case where a recognition result text contains a keyword that indicates an external application, the command generator 25 identifies which of the first to third input terminals 81 to 83 (FIG. 1) is associated with the external application.

In Embodiment 1, the command generator 25 first identifies which of the first to third terminal apparatuses 4 to 6 (FIG. 1) is installed with the external application. In particular, the command generator 25 identifies, with reference to the first management table 231 and the application table 232, the apparatus installed with the external application that corresponds to the keyword contained in the recognition result text.

Furthermore, the command generator 25 identifies which of the first to third input terminals 81 to 83 (FIG. 1) the apparatus thus identified is connected to. In particular, the command generator 25 identifies, with reference to the first management table 231, the input terminal associated with the apparatus thus identified.

Further, having identified the input terminal, the command generator 25 generates, as a control command, a first switching command to activate the input terminal thus identified and a first start-up command to start the external application that corresponds to the keyword contained in the recognition result text. The first switching command is a command to designate any of the first to third input terminals 81 to 83 and activate the input terminal thus designated. The control command (i.e. the first switching command and the first start-up command) is transmitted to the first terminal apparatus 4 (meeting room PC) described with reference to FIG. 1. In the following description, application software that corresponds to a keyword contained in a recognition result text is sometimes referred to as "designated application". The designated application is application software designated by a user's speech.

Second Control Command Generation Process

In a case where a recognition result text contains a keyword that indicates the internally-stored application, the command generator 25 generates, as a control command, a second switching command to inactivate all of the first to third input terminals 81 to 83 and a second start-up command to start the internally-stored application that corresponds to the keyword contained in the recognition result text. The control command (i.e. the second switching command and the second start-up command) is transmitted to the first terminal apparatus 4 (meeting room PC) described with reference to FIG. 1.

Third Control Command Generation Process

In a case where a recognition result text contains a keyword that indicates one of the first to third terminal apparatuses 4 to 6 (FIG. 1), the command generator 25 identifies which of the first to third input terminals 81 to 83 (FIG. 1) the apparatus is connected to.

In particular, the command generator 25 identifies, with reference to the first management table 231, the apparatus that corresponds to the keyword contained in the recognition result text. Further, the command generator 25 identifies, with reference to the first management table 231, the input terminal associated with the apparatus thus identified. Having identified the input terminal, the command generator 25 generates a first switching command as a control command. The control command (first switching command) is transmitted to the first terminal apparatus 4 (meeting room PC) described with reference to FIG. 1.

Fourth Control Command Generation Process

In a case where a recognition result text contains a keyword that takes the display apparatus 8 (FIG. 1) back to the last display screen it displayed, the command generator 25 generates, with reference to the second management table 236, a control command to cause the display apparatus 8 (FIG. 1) to display the last display screen it displayed. An example of a keyword that takes the display apparatus 8 (FIG. 1) back to the last display screen it displayed is "previous screen", "original screen", or "earlier screen".

Specifically, the second management table 236 shows that in a case where image information displayed on the last display screen is image information received by one of the first to third input terminals 81 to 83 (FIG. 1), the image information received by the input terminal was displayed on the last display screen. Typically, the second management table 236 indicates the input terminal that has received the image information displayed on the last display screen. In this case, the command generator 25 generates a first switching command as a control command. The control command (first switching command) is transmitted to the first terminal apparatus 4 (meeting room PC) described with reference to FIG. 1.

Further, in a case where image information displayed on the last display screen is image information generated by the internally-stored application, the second management table 236 shows that the image information generated by the internally-stored application was displayed on the last display screen. In this case, the command generator 25 generates a second switching command and a second start-up command as a control command. The control command (i.e. the second switching command and the second start-up command) is transmitted to the first terminal apparatus 4 (meeting room PC) described with reference to FIG. 1.

The foregoing has described the first to fourth control command generation processes. The following describes, with reference to FIGS. 1 and 2, a speech data output process that the controller 24 executes.

In a case where a keyword contained in a recognition result text does not correspond to any of the keywords that belong to the first to third keyword groups 233 to 235, the controller 24 executes a speech data output process. Specifically, the controller 24 transmits predetermined speech data to the microphone/speaker apparatus 7. The predetermined speech data is stored in advance in the memory 23. The predetermined speech data represents a message that prompts the user to speak again. For example, the content of the message is "Could you say that again?"

The foregoing has described the meeting support server 2 with reference to FIGS. 1 and 2. Although the meeting support server 2 shown in FIG. 2 includes the speech recognizer 22, the controller 24 may alternatively have the function of the speech recognizer 22. In this case, the speech recognizer 22 is omitted.

Next, a configuration of the first terminal apparatus 4 is described with reference to FIGS. 1 to 3. FIG. 3 is a diagram showing a configuration of the first terminal apparatus 4 (meeting room PC). As shown in FIG. 3, the first terminal apparatus 4 includes an output terminal 41, a communicator 42, an operator 43, a display 44, a memory 45, and a controller 46.

The output terminal 41 outputs image information. The output terminal 41 is connected to the first input terminal 81 (FIG. 1) of the display apparatus 8. In a case where the first input terminal 81 (FIG. 1) of the display apparatus 8 is activated, image information outputted from the output terminal 41 is displayed by the display apparatus (FIG. 1).

The communicator 42 is connected to the LAN cable 10 (FIG. 1). The communicator 42 includes, for example, a LAN board or a LAN module. The communicator 42 controls communication with the meeting support server 2 (FIG. 1). Further, the communicator 42 controls communication with the second and third terminal apparatuses 5 and 6 (FIG. 1) and the display apparatus 8 (FIG. 1).

Specifically, the communicator 42 receives a control command from the meeting support server 2 (FIG. 1). Further, the communicator 42 transmits a first or second switching command to the display apparatus 8 (FIG. 1). In a case of transmitting the second switching command, the communicator 42 also transmits a second start-up command to the display apparatus 8 (FIG. 1). Further, the communicator 42 transmits a first start-up command to the apparatus installed with the designated application (external application). In a case where the apparatus installed with the designated application is the first terminal apparatus 4, the communicator 42 transmits the first start-up command to itself.

The operator 43 is operated by a user to receive an instruction from the user. The operator 43 outputs, to the controller 46, a signal corresponding to the user's operation. As a result, the first terminal apparatus 4 executes an action corresponding to the operation accepted by the operator 43. The operator 43 includes, for example, a pointing device and a keyboard. The operator 43 may also include a touch sensor. The touch sensor is stacked on a display surface of the display 44.

The display 44 displays various types of screen. In Embodiment 1, the display 44 displays a connected apparatus registration screen 60, which will be described later with reference to FIG. 6. The connected apparatus registration screen 60 is a user interface screen, and accepts registration of various types of information. An example of the display 44 is a liquid crystal display or an organic EL (electroluminescence) display. In a case where the touch sensor is stacked on the display surface of the display 44, the display 44 functions as a touch display.

The memory 45 includes, for example, semiconductor memories such as a RAM and a ROM. Furthermore, the memory 45 includes a storage device such as an HDD. The memory 45 has stored therein a control program that the controller 46 executes.

In Embodiment 1, the memory 45 has stored therein a display switching control program 451, an application start-up instruction control program 452, and application software 453 (external application).

The display switching control program 451 is a program for transmitting, to the display apparatus 8 (FIG. 1), a first or second switching command received from the meeting support server 2 (FIG. 1). The application start-up instruction control program 452 is a program for transmitting, to the apparatus installed with the designated application, a first or second start-up command received from the meeting support server 2 (FIG. 1).

The controller 46 includes, for example, a processor such as a CPU. Further, the controller 46 (computer) controls, in accordance with the control program (computer program) stored in the memory 45, how the first terminal apparatus 4 operates.

In Embodiment 1, the controller 46 executes the display switching control program 451 to transmit, to the display apparatus 8 (FIG. 1), the first or second switching command received from the meeting support server 2 (FIG. 1).

Further, the controller 46 executes the application start-up instruction control program 452 to identify the apparatus installed with the designated application and transmit, to the apparatus installed with the designated application, the first or second start-up command received from the meeting support server 2 (FIG. 1).

Further, the controller 46 transmits image data representing an image being displayed on the display 44 to the first input terminal 81 (FIG. 1) via the output terminal 41. In a case where the first input terminal 81 is activated, the display apparatus 8 (FIG. 1) displays the image being displayed on the display 44. For example, the display 44 may display a data file currently processed by the external application 453. In other words, the display 44 may display a data file currently opened by the external application 453. In this case, the display 8 (FIG. 1) displays an image representing the data file currently opened by the external application 453. The data file is stored in the memory 45. The controller 46 may also transmit the image data representing the image being displayed on the display 44 to the first input terminal 81 (FIG. 1) via the output terminal 41 (FIG. 1) and the LAN cable 10 (FIG. 1) to cause the display apparatus 8 (FIG. 1) to display the image being displayed on the display 44.

Next, a configuration of the microphone/speaker apparatus 7 is described with reference to FIGS. 1 to 4. FIG. 4 is a diagram showing a configuration of the microphone/speaker apparatus 7. As shown in FIG. 4, the microphone/speaker apparatus 7 includes a communicator 71, a speech inputter 72, a speech outputter 73, a memory 74, and a controller 75.

The communicator 71 is connected to the access point 3 (FIG. 1). The communicator 71 controls communication with the meeting support server 2 (FIG. 1). Specifically, the communicator 71 transmits speech data to the meeting support server 2 (FIG. 1). Further, the communicator 71 receives speech data from the meeting support server 2 (FIG. 1). An example of the communicator 71 is a wireless LAN board or a wireless LAN module.

The speech inputter 72 collects the sounds of speech that a user has produced, and converts the sounds thus collected into an analog electric signal. The analog electric signal is inputted to the controller 75. An example of the speech inputter 72 is a microphone. The speech outputter 73 outputs the sounds of speech that correspond to speech data received from the meeting support server 2 (FIG. 1). An example of the speech outputter 73 is a speaker.

The memory 74 includes, for example, semiconductor memories such as a RAM and a ROM. The memory 74 may further include a storage device such as an HDD. The memory 74 has stored therein a control program that the controller 75 executes.

The controller 75 includes, for example, a processor such as a CPU or an MPU. Further, the controller 75 (computer) controls, in accordance with the control program (computer program) stored in the memory 74, how the microphone/speaker apparatus 7 operates.

Next, a configuration of the display apparatus 8 is described with reference to FIGS. 1 to 5. FIG. 5 is a diagram showing a configuration of the display apparatus 8. As shown in FIG. 5, the display apparatus 8 includes a communicator 84, an input terminal switcher 85, a display 86, a memory 87, and controller 88 in addition to the first to third input terminals 81 to 83 described with reference to FIG. 1.

The communicator 84 is connected to the LAN cable 10 (FIG. 1). The communicator 84 includes, for example, a LAN board or a LAN module. The communicator 84 controls communication with the first terminal apparatus 4 (FIG. 1). Specifically, the communicator 84 receives a first or second switching command from the first terminal apparatus 4 (FIG. 1). In a case of receiving the second switching command, the communicator 84 also receives a second start-up command.

The input terminal switcher 85 selectively activates any one of the first to third input terminals 81 to 83. In Embodiment 1, the input terminal switcher 85 activates any one of the first to third input terminals 81 to 83 in accordance with the first switching command. Further, the input terminal switcher 85 inactivates all of the first to third input terminals 81 to 83 in accordance with the second switching command.

The display 86 displays image information that is received by that one of the first to third input terminals 81 to 83 which has been activated. Alternatively, the display 86 displays image information that is generated by the internally-stored application. An example of the display 86 is a liquid crystal display or an organic EL display. The display 86 includes a touch sensor. In other words, the display 86 may be a touch display.

The memory 87 includes, for example, semiconductor memories such as a RAM and a ROM. Furthermore, the memory 87 may include a storage device such as an HDD. The memory 87 has stored therein a control program that the controller 88 executes. In Embodiment 1, the memory 87 has stored therein built-in electronic blackboard software 871. The built-in electronic blackboard software 871 is an example of the internally-stored application.

The controller 88 includes, for example, a processor such as a CPU or an MPU. Further, the controller (computer) controls, in accordance with the control program (computer program) stored in the memory 87, how the display apparatus 8 operates.

In Embodiment 1, the controller 88 controls the input terminal switcher 85 in accordance with the first or second switching command. Specifically, upon receiving the first switching command, the controller 88 activates any of the first to third input terminals 81 to 83 in accordance with the first switching command, and upon receiving the second switching command, the controller 88 inactivates all of the first to third input terminals 81 to 83. Further, the controller 88 starts the built-in electronic blackboard software 871 in accordance with the second start-up command.

The foregoing has described Embodiment 1 with reference to FIGS. 1 to 5. Although, in Embodiment 1, the meeting support server 2 executes a speech recognition process, the microphone/speaker apparatus 7 may alternatively execute a speech recognition process to transmit a recognition result text to the meeting support server 2.

Embodiment 1 makes it possible that in a case where a terminal apparatuses (first to third terminal apparatuses 4 to 6) connected to the display apparatus 8 is installed with application software, image information that is generated by the application software can be displayed in accordance with a user's speech.

Further, Embodiment 1 makes it easy to create a control command, as it generates a control command with reference with the tables (i.e. the first management table 231, the application table 232, and the second management table 236).

Furthermore, Embodiment 1 makes it possible to use the second management table 236 to manage a history of display screens that the display apparatus 8 displayed. This allows a user to, without recognizing the source of output of image information displayed on the last screen, use a keyword such as "previous screen", "original screen", or "earlier screen" to take the display apparatus 8 back to the last display screen it displayed. This allows the user to more intuitively switch the display apparatus 8 from one display screen to another.

Further, Embodiment 1 makes it possible to voice-activate not only the application software installed on the apparatuses (first to third terminal apparatuses 4 to 6) connected to the display apparatus 8 but also the application software installed on the display apparatus 8. This makes it possible to enhance convenience for users.

Next, the connected apparatus registration screen 60 is described with reference to FIGS. 1 to 3 and FIG. 6. FIG. 6 is a diagram showing the connected apparatus registration screen 60 according to Embodiment 1. The connected apparatus registration screen 60 is an interface screen that is displayed on the display 44 (FIG. 3) of the first terminal apparatus 4. A user can operate the operator 43 (FIG. 3) of the first terminal apparatus 4 to set (register) various types of information in the connected apparatus registration screen 60. The first terminal apparatus 4 (FIG. 3) may transmit image data representing the user interface screen to the display apparatus 8 (FIG. 5) to cause the display 86 (FIG. 5) of the display apparatus 8 to display the user interface screen being displayed on the display 44 (FIG. 3) of the first terminal apparatus 4.

As shown in FIG. 6, the connected apparatus registration screen 60 of Embodiment 1 displays an input terminal name column 61, a connected apparatus name registration column 62, and a plurality of application information registration columns 63. Further, the connected apparatus registration screen 60 displays a save button 64 and a cancel button 65.

Into the input terminal name column 61, names (default names) set in advance as the respective names of the first to third input terminals 81 to 83 (FIG. 1) are entered. Specifically, "D-SUB terminal", "HDMI (registered trademark) terminal", "DisplayPort", or the like is entered into the input terminal name column 61.

Into the connected apparatus name registration column 62, the names (apparatus names) of the apparatuses that are connected to the first to third input terminals 81 to 83 (FIG. 1), respectively, are entered. The apparatus names are arbitrarily determined by users.

Into the application information registration column 63, information on applications installed on the apparatuses that are connected to the first to third input terminals 81 to 83 (FIG. 1), respectively, are entered. Specifically, the application information registration column 63 accepts entry of the name (user label) of application software as arbitrarily determined by a user and the application name (manufacturer's recommended name) of application software.

The save button 64 is a button for saving information entered into the connected apparatus registration screen 60. When a user operates the operator 43 (FIG. 3) to input an instruction to depress the save button 64, the information entered into the connected apparatus registration screen 60 is saved and the controller (FIG. 2) of the meeting support server 2 creates the first management table 231 (FIG. 2) and the application table 232 (FIG. 2).

The cancel button 65 is a button for canceling an information registration process performed using the connected apparatus registration screen 60. When a user operates the operator 43 (FIG. 3) to input an instruction to depress the cancel button 65, the information entered into the connected apparatus registration screen 60 is not saved and the connected apparatus registration screen 60 is closed.

Next, the first management table 231 is described with reference to FIGS. 1 to 3 and FIG. 7A. FIG. 7A is a diagram showing the first management table 231 according to Embodiment 1. As shown in FIG. 7A, the first management table 231 includes a display apparatus ID column 701, a first tag column 702, a second tag column 703, and an application information column 704.

Into the display apparatus ID column 701, an identification number (default value) of the display apparatus 8 (FIG. 1) is entered. The identification number of the display apparatus 8 (FIG. 1) is set in advance.

Into the first tag column 702, first tags of the first to third input terminals 81 to 83 (FIG. 1) are entered. As the first tags of the first to third input terminals 81 to 83 (FIG. 1), the names (default names) set in advance as the respective names of the first to third input terminals 81 to 83 (FIG. 1) are used, respectively. In particular, the first tag column 702 reflects the names entered into the input terminal name 61 described with reference to FIG. 6. Specifically, the controller 24 (FIG. 2) of the meeting support server 2 creates the first tag column 702 on the basis of the information entered into the input terminal name 61 described with reference to FIG. 6.

Furthermore, in a case where the display apparatus (FIG. 1) is installed with an internally-stored application, a first tag of the internally-stored application is entered into the first tag column 702. The first tag of the internally-stored application may be set in advance or may be set (registered) in advance by a user operating the operator 43 (FIG. 3) of the first terminal apparatus 4.

Into the second tag column 703, second tags of the first to third input terminals 81 to 83 (FIG. 1) are entered. As the second tags of the first to third input terminals 81 to 83 (FIG. 1), the names (apparatus names) of the apparatuses (first to third terminal apparatuses 4 to 6) that are connected to the first to third input terminals 81 to 83 (FIG. 1) are set, respectively. In particular, the second tag column 703 reflects the names entered into the connected apparatus name registration column 62 described with reference to FIG. 6. Specifically, the controller 24 (FIG. 2) of the meeting support server 2 creates the second tag column 703 on the basis of the information entered into the connected apparatus name registration column 62 described with reference to FIG. 6.

Furthermore, in a case where the display apparatus (FIG. 1) is installed with an internally-stored application, the name (user label) of the application as arbitrarily determined by a user is entered as a second tag of the internally-stored application into the second tag column 703. The user label of the internally-stored application may be set (registered) in advance by the user operating the operator 43 (FIG. 3) of the first terminal apparatus 4.

The application information column 704 shows whether each apparatus entered into the second tag column 703 is installed with an external application. Specifically, the controller 24 (FIG. 2) of the meeting support server 2 creates the application information column 704 on the basis of the information entered into the application information registration column 63 described with reference to FIG. 6. Note here that an "application table 1" of the application information column 704 shows that an external application has been installed and information on the external application has been entered into the "application table 1". An "application table 2" and an "application table 3" are similar to the "application table 1". In a case where no external application has been installed, the application information column 704 shows "Null".

In a case where the display apparatus 8 (FIG. 1) is installed with an internally-stored application, the application name (manufacture's recommended name) of the internally-stored application is entered as an application tag into the application information column 704. The application name of the internally-stored application is set in advance. Alternatively, the application name of the internally-stored application may be set (registered) in advance by a user operating the operator 43 (FIG. 3) of the first terminal apparatus 4.

Next, the application table 232 is described with reference to FIGS. 1 to 3 and FIG. 7B. FIG. 7B is a diagram showing the application table 232 according to Embodiment 1. In particular, FIG. 7B illustrates the "application table 1". As shown in FIG. 7B, the application table 232 includes a start-up command column 705, an application tag column 706, and a user label tag column 707.

Into the start-up command column 705, a start-up command (first start-up command) to start an external application is entered. Specifically, the controller 24 (command generator 25) of the meeting support server 2 described with reference to FIG. 2 generates a start-up command using the application name of an external application. In particular, "exe"+"application name" is generated as a start-up command, and the start-up command thus generated is entered into the start-up command column 705. A start-up command (second start-up command) to start an internally-stored application is generated in a similar manner to a start-up command to start an external application.

Into the application tag column 706, the application name of an external application is entered as an application tag of the external application. Specifically, the controller 24 (FIG. 2) of the meeting support server 2 creates the application tag column 706 on the basis of the information entered into the application information registration column 63 described with reference to FIG. 6.

Into the user label tag column 707, a user label of an external application is entered as a user label tag of the external application. Specifically, the controller 24 (FIG. 2) of the meeting support server 2 creates the user label tag column 707 on the basis of the information entered into the application information registration column 63 described with reference to FIG. 6.

Figure 8:
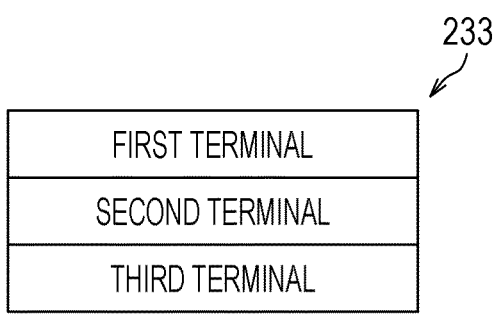
FIG. 8 is a diagram showing a first keyword group according to Embodiment 1 of the present disclosure.

Next, the first keyword group 233 is described with reference to FIGS. 1, 2, 7A, and 8. FIG. 8 is a diagram showing the first keyword group 233 according to Embodiment 1. In Embodiment 1, the first keyword group 233 includes the apparatus names of the first to third terminal apparatuses 4 to 6 (FIG. 1) that are connected to the first to third input terminals 81 to 83 (FIG. 1), respectively. Specifically, the controller 24 (FIG. 2) of the meeting support server 2 creates the first keyword group 233 on the basis of the information entered into the second tag column 703 described with reference to FIG. 7A.

Figure 9:
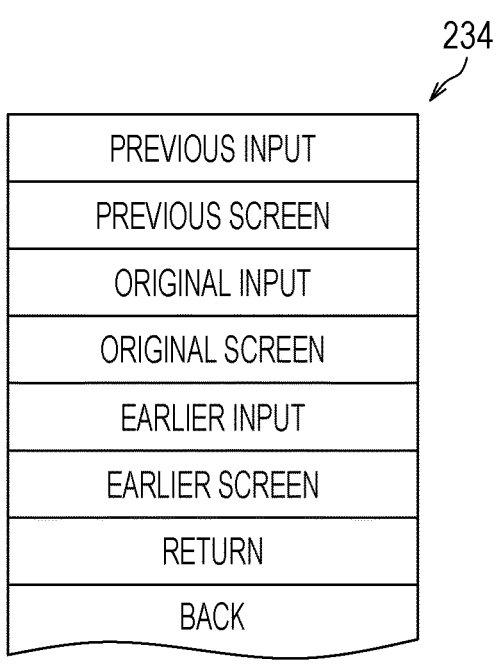
FIG. 9 is a diagram showing a second keyword group according to Embodiment 1 of the present disclosure.

Next, the second keyword group 234 is described with reference to FIGS. 1, 3, and 9. FIG. 9 is a diagram showing the second keyword group 234 according to Embodiment 1. In Embodiment 1, the second keyword group 234 includes keywords that take the display apparatus 8 (FIG. 1) back to the last display screen it displayed. The second keyword group 234 may be set in advance or may be set (registered) in advance by a user operating the operator 43 (FIG. 3) of the first terminal apparatus 4.

Figure 10:
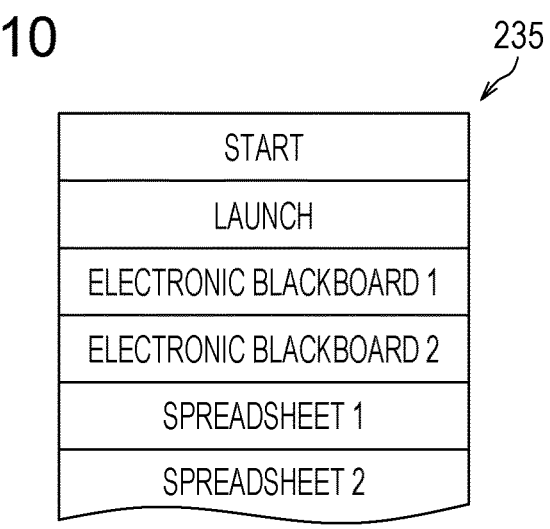
FIG. 10 is a diagram showing a third keyword group according to Embodiment 1 of the present disclosure.

Next, the third keyword group 235 is described with reference to FIGS. 1 to 3, FIGS. 7A and 7B, and FIG. 10. FIG. 10 is a diagram showing the third keyword group 235 according to Embodiment 1. In Embodiment 1, the third keyword group 235 includes user labels of the application software installed on the first to third terminal apparatuses 4 to 6 (FIG. 1) and the display apparatus 8 (FIG. 1). Specifically, the controller 24 (FIG. 2) of the meeting support server 2 creates the third keyword group 235 on the basis of the information entered into the application information column 704 described with reference to FIG. 7A and the information entered into the user label tag column 707 described with reference to FIG. 7B.

Further, the third keyword group 235 includes a keyword that gives an instruction to start application software. FIG. 10 shows "start" and "launch" as examples. A keyword that gives an instruction to start application software may be set in advance or may be set (registered) in advance by a user operating the operator 43 (FIG. 3) of the first terminal apparatus 4.

The foregoing has described the first management table 231, the application table 232, and the first to third keyword groups 233 to 235 with reference to FIG. 6, FIGS. 7A and 7B, and FIGS. 8 to 10. Embodiment 1 allows users to arbitrarily set keywords that indicate the first to third terminal apparatuses 4 to 6. Further, Embodiment 1 allows users to arbitrarily determine keywords that indicate the external applications and keywords that indicate the internally-stored application. This allows users to more easily switch from one display screen to another.

Next, the second management table 236 is described with reference to FIGS. 1, 2, 7A, and 11. FIG. 11 is a diagram showing the second management table 236 according to Embodiment 1. As shown in FIG. 11, the second management table 236 includes a display apparatus ID column 708, a default setting terminal column 709, a "current display" column 710, and a "last display" column 711.

Into the display apparatus ID column 708, the identification number (default value) of the display apparatus 8 (FIG. 1) is entered. The identification number of the display apparatus 8 (FIG. 1) is set in advance.

Into the default setting terminal column 709, the first tag (FIG. 7A) of any of the first to third input terminals 81 to 83

(FIG. 1) is entered. The "default setting terminal" is set in advance. Alternatively, the "default setting terminal" may be set (registered) in advance by a user operating the operator 43 (FIG. 3) of the first terminal apparatus 4.

The "current display" column 710 and the "last display" column 711 are updated every time the display apparatus 8 (FIG. 1) switches from one display screen to another. Specifically, the controller 24 (FIG. 2) of the meeting support server 2 updates the "current display" column 710 and the "last display" column 711 with reference to the first management table 231 (FIG. 7A).

For example, in a case where image information currently displayed on the display screen is image information received by one of the first to third input terminals 81 to 83 (FIG. 1), the first tag (FIG. 7A) of the input terminal is entered into the "current display" column 710. Further, in a case where the image information currently displayed on the display screen is image information generated by the internally-stored application, the application tag (FIG. 7A) of the internally-stored application is entered into the "current display" column 710. Upon switching to another display screen, the information that has been in the "current display" column 710 is entered into the "last display" column 711.

Figure 12:
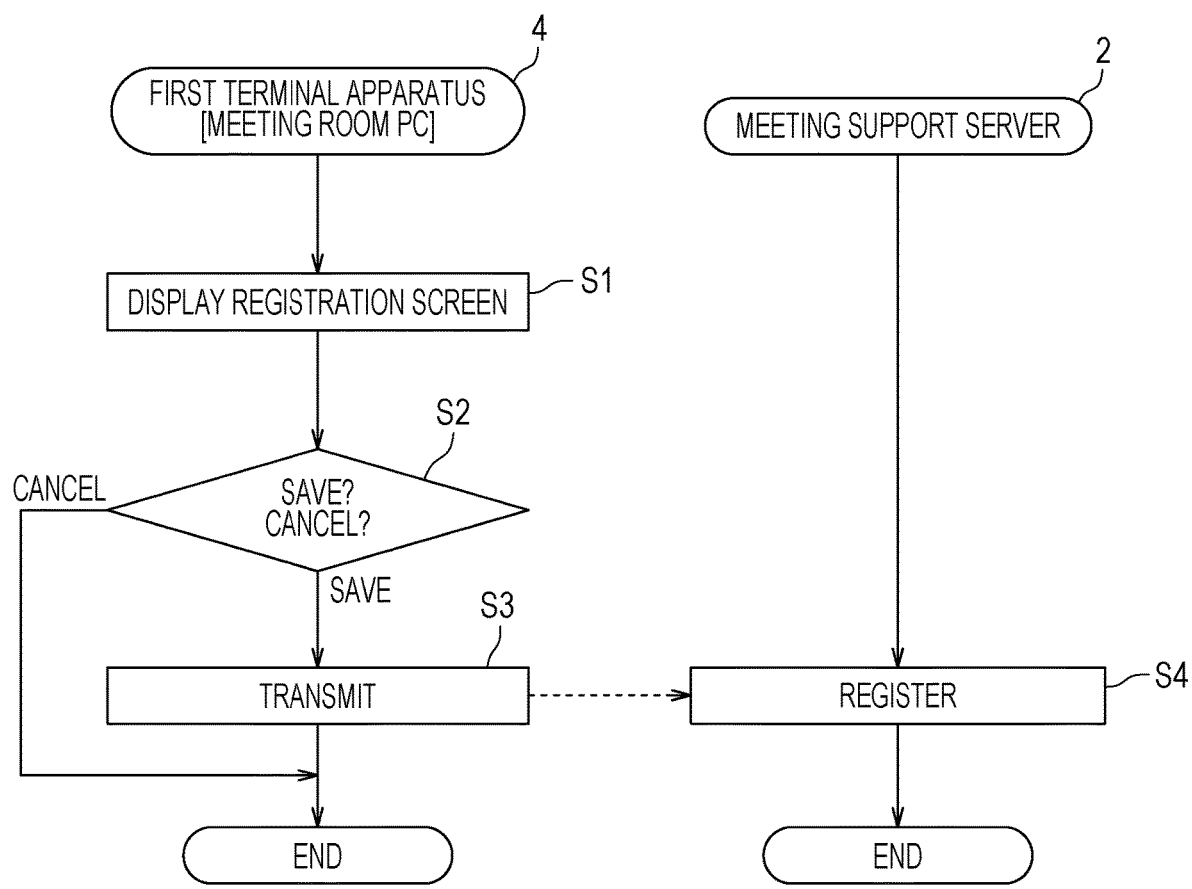
FIG. 12 is a diagram showing a registration process according to Embodiment 1 of the present disclosure.

Next, processes (sets of actions) that the meeting system 1 executes are described with reference to FIGS. 1 to 17. First, a registration process is described with reference to FIGS. 1 to 12. The registration process is a process for registering various types of information using the connected apparatus registration screen 60 described with reference to FIG. 6. FIG. 12 is a diagram showing a registration process according to Embodiment 1.

The registration process shown in FIG. 12 starts when a user operates the operator 43 of the first terminal apparatus 4 to input an instruction to cause the display 44 of the first terminal apparatus 4 to display the connected apparatus registration screen 60.

As shown in FIG. 12, when the user inputs the instruction to display the connected apparatus registration screen 60, the controller 46 of the first terminal apparatus 4 causes the display 44 of the first terminal apparatus 4 to display the connected apparatus registration screen 60 (step S1).

Having caused the display 44 of the first terminal apparatus 4 to display the connected apparatus registration screen 60, the controller 46 of the first terminal apparatus 4 determines whether which of the save button 64 and the cancel button 65 of the connected apparatus registration screen 60 has been depressed (step S2).

When the user operates the operator 43 of the first terminal apparatus 4 to depress the save button 64 (step S2; SAVE), the controller 46 of the first terminal apparatus 4 transmits, to the meeting support server 2, the various types of information entered into the connected apparatus registration screen 60 (step S3), and then ends the process. Alternatively, when the user operates the operator 43 of the first terminal apparatus 4 to depress the cancel button 65 (step S2; CANCEL), the controller 46 of the first terminal apparatus 4 ends the process without transmitting, to the meeting support server 2, the various types of information entered into the connected apparatus registration screen 60.

The controller 24 of the meeting support server 2 registers, in the first management table 231 and the application table 232, the information received from the first terminal apparatus 4 (step S4). Further, the controller 24 of the meeting support server 2 creates the first keyword group 233 and the third keyword group 235 with reference to the first management table 231 and the application table 232, and then ends the process.

Next, a display switching process that the meeting system 1 executes is described with reference to FIGS. 1 to 5 and FIGS. 13 to 15. The display switching process is a process for switching the display apparatus 8 from one display screen to another.

Figure 13:
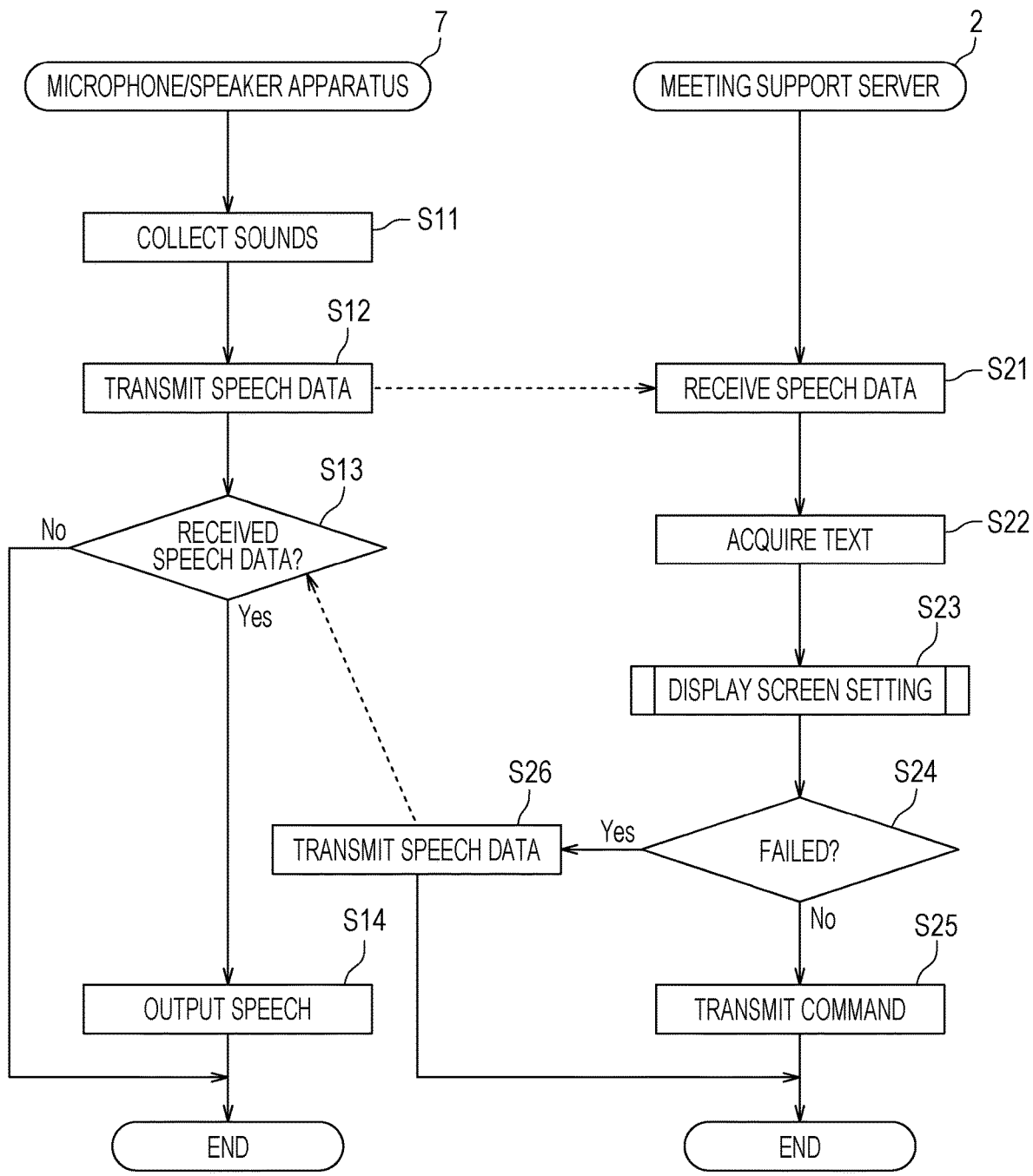
FIG. 13 is a diagram showing a display switching process according to Embodiment 1 of the present disclosure.

First, a process that the meeting support server 2 and the microphone/speaker apparatus 7 execute is described with reference to FIGS. 1, 2, 4, and 13. FIG. 13 is a diagram showing a display switching process according to Embodiment 1 and, in particular, shows a process that the meeting support server 2 and the microphone/speaker apparatus 7 execute.

The display switching process starts when a user produces sounds of speech. As shown in FIG. 13, when a user produces sounds of speech, the microphone/speaker apparatus 7 collects the sounds of the user's speech (step S11) and transmits, to the meeting support server 2, speech data that corresponds to the user's speech (step S12).

When the meeting support server 2 receives the speech data from the microphone/speaker apparatus 7 (step S21), the speech recognizer 22 of the meeting support server 2 converts the speech data into text information. As a result, the controller 24 of the meeting support server 2 acquires a recognition result text (step S22).

Having acquired the recognition result text, the controller 24 of the meeting support server 2 executes a display screen setting process (step S23). Specifically, the controller 24 of the meeting support server 2 executes any of the first to fourth control command generation processes described with reference to FIG. 2. The display screen setting process will be described later with reference to FIG. 17.

After the execution of the display screen setting process, the controller 24 of the meeting support server 2 determines whether the controller 24 of the meeting support server 2 has failed in setting a display screen (step S24). In a case where the controller 24 of the meeting support server 2 has determined that the controller 24 of the meeting support server 2 has not failed in setting a display screen (step S24; No), the controller 24 of the meeting support server 2 transmits, to the first terminal apparatus 4, a control command generated by any of the first to fourth control command generation processes (step S25), and then ends the process shown in FIG. 13.

On the other hand, in a case where the controller 24 of the meeting support server 2 has determined that the controller 24 of the meeting support server 2 has failed in setting a display screen (step S24; Yes), the controller 24 of the meeting support server 2 executes the speech data output process described with reference to FIG. 2 to transmit, to the microphone/speaker apparatus 7, speech data representing a message that prompts the user to speak again (step S26). Having executed the speech data output process, the controller 24 of the meeting support server 2 ends the process shown in FIG. 13.

After having transmitted the speech data (step S12), the microphone/speaker apparatus 7 determines whether it has received speech data from the meeting support server (step S13). In a case where the microphone/speaker apparatus 7 has not received speech data from the meeting support server 2 (step S13; No), the microphone/speaker apparatus 7 ends the process shown in FIG. 13.

On the other hand, in a case where the microphone/speaker apparatus 7 has received speech data from the meeting support server 2 (step S13; Yes), the microphone/speaker apparatus 7 outputs the sounds of speech that correspond to the speech data received from the meeting support server 2 (step S14), and then ends the process shown in FIG. 13. This allows the user to use sounds of speech to again give an instruction to switch the display screen to a desired screen.

Figure 14:
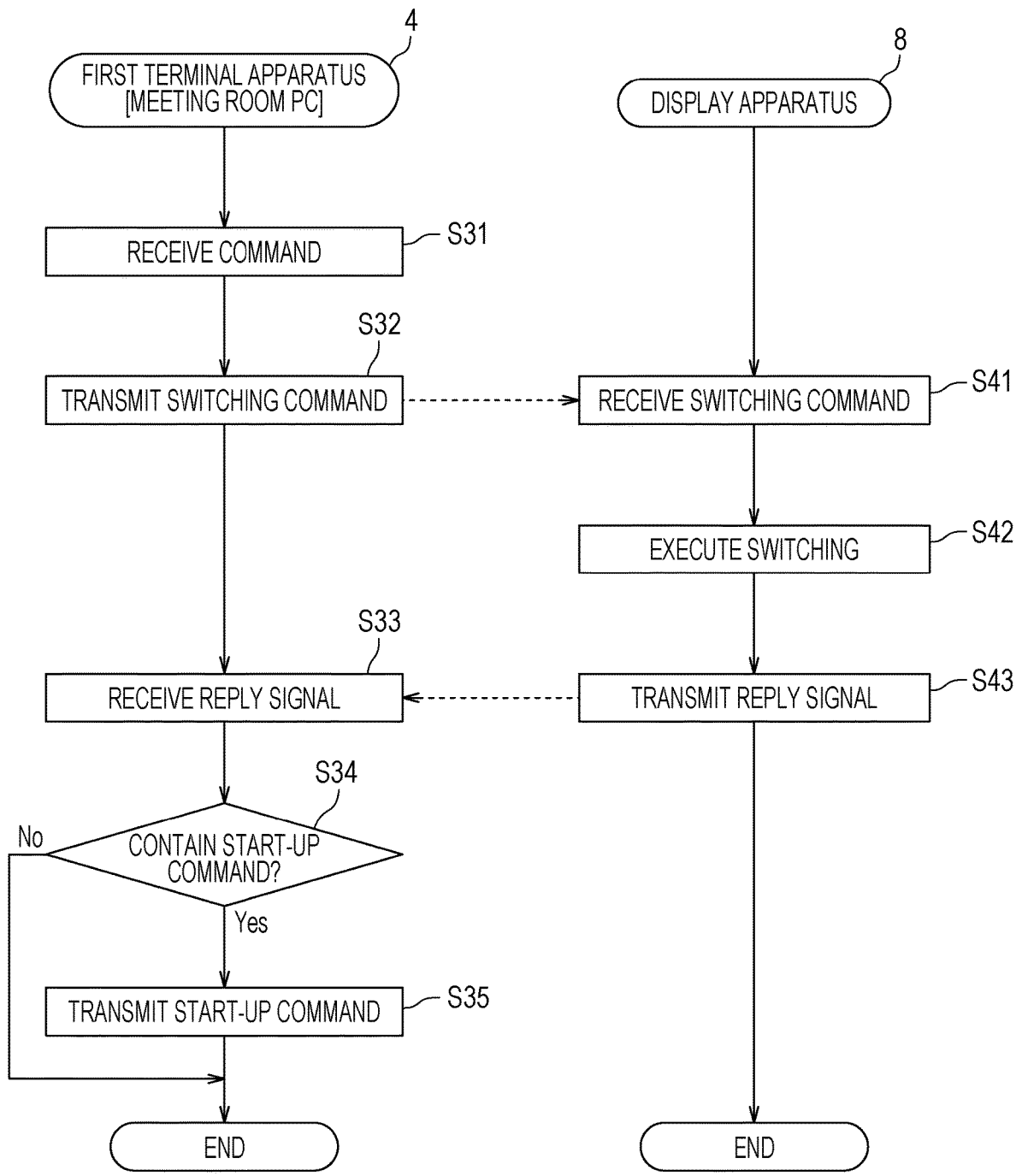
FIG. 14 is a diagram showing a display switching process according to Embodiment 1 of the present disclosure.

Next, a process that the first terminal apparatus (meeting room PC) and the display apparatus 8 execute is described with reference to FIGS. 1, 3, 5, and 14. FIG. 14 is a diagram showing a display switching process according to Embodiment 1 and, in particular, shows a process that the first terminal apparatus 4 (meeting room PC) and the display apparatus 8 execute.

As shown in FIG. 14, upon receiving a control command from the meeting support server 2 (step S31), the controller 46 of the first terminal apparatus 4 transmits, to the display apparatus 8, a switching command (first or second switching command) contained in the control command (step S32).

Upon receiving the switching command (first or second switching command) from the first terminal apparatus (step S41), the controller 88 of the display apparatus 8 executes a switching process in accordance with the switching command (step S42). Specifically, in a case where the switching command is a first switching command, the controller 88 of the display 8 activates that one of the first to third input terminals 81 to 83 which has been designated by the first switching command. Alternatively, in a case where the switching command is a second switching command, the controller 88 of the display 8 inactivates all of the first to third input terminals 81 to 83.

After having executed the switching process, the controller 88 of the display apparatus 8 transmits a reply signal to the first terminal apparatus 4 (step S43), and then ends the process shown in FIG. 14. The reply signal indicates that the switching process has been completed.

Upon receiving the reply signal from the display apparatus 8 (step S33), the controller 46 of the first terminal apparatus 4 determines whether the control command received from the meeting support server 2 contains a start-up command (first or second start-up command) (step S34).

Having determined that the control command does not contain a start-up command (step S34; No), the controller 46 of the first terminal apparatus 4 ends the process shown in FIG. 14. On the other hand, having determined that the control command contains a start-up command (step S34; Yes), the controller 46 of the first terminal apparatus 4 transmits the start-up command (first or second start-up command) to the apparatus installed with the designated application (step S35), and then ends the process shown in FIG. 14.

Figure 15:
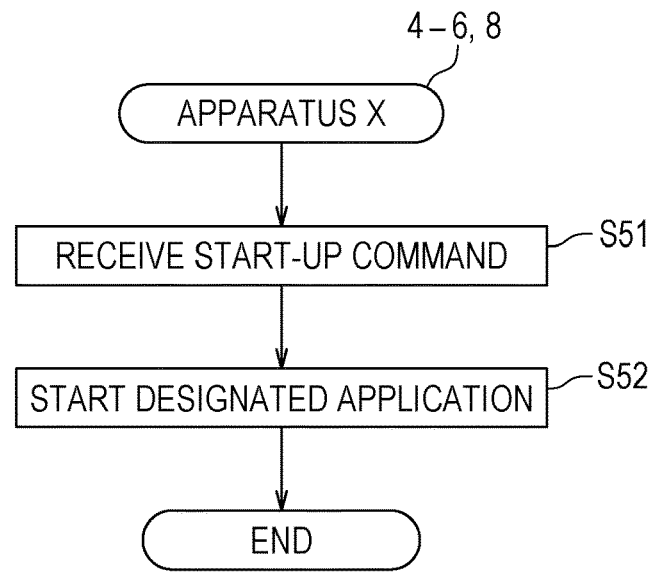
FIG. 15 is a diagram showing a display switching process according to Embodiment 1 of the present disclosure.

Next, a process that is executed by an apparatus X having received a start-up command (first or second start-up command) is described with reference to FIGS. 1 and 15. FIG. 15 is a diagram showing a display switching process according to Embodiment 1 and, in particular, shows a process that is executed by an apparatus X having received a start-up command (first or second start-up command).

When the first terminal apparatus 4 transmits a start-up command, the apparatus X receives the start-up command (step S51). Specifically, in a case where the start-up command is a first start-up command, the first start-up command is received by any of the first to third terminal apparatuses 4 to 6 (step S51). On the other hand, in a case where the start-up command is a second start-up command, the second start-up command is received by the display apparatus 8 (step S51). Upon receiving the start-up command, the controller of the apparatus X starts the designated application (step S52), and then ends the process shown in FIG. 15.

Figure 16:
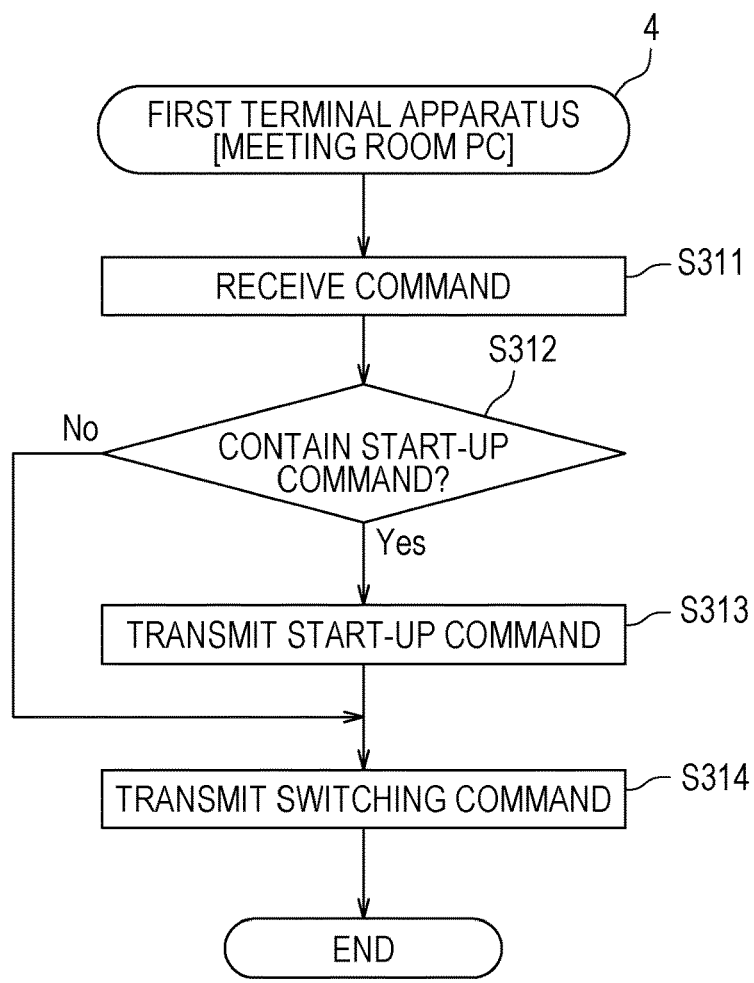
FIG. 16 is a diagram showing another example of a display switching process according to Embodiment 1 of the present disclosure.

Next, another example of a display switching process is described with reference to FIG. 16. FIG. 16 is a diagram showing another example of a display switching process according to Embodiment 1. In particular, FIG. 16 shows another example of a process that the first terminal apparatus 4 (meeting room PC) executes.

As shown in FIG. 16, upon receiving a control command from the meeting support server 2 (step S311), the controller 46 of the first terminal apparatus 4 determines whether the control command contains a start-up command (first or second start-up command) (step S312).

Having determined that the control command contains a start-up command (step S312; Yes), the controller 46 of the first terminal apparatus 4 transmits the start-up command (first or second start-up command) to the apparatus installed with the designated application (step S313). After that, the controller 46 of the first terminal apparatus 4 transmits a switching command (first or second switching command) to the display apparatus 8 (step S314), and then ends the process shown in FIG. 16.

On the other hand, having determined that the control command does not contain a start-up command (step S312; No), the controller 46 of the first terminal apparatus 4 transmits a switching command (first or second switching command) to the display apparatus 8 (step S314) without transmitting a start-up command, and then ends the process shown in FIG. 16.

The foregoing has described another example of a display switching process with reference to FIG. 16. The process shown in FIG. 16 makes it possible to switch from one display screen to another after having started application software. This reduces the likelihood of occurrence of a malfunction in which the display screen blacks out for a moment.

That is, in a case where the start-up of the application software is slow, transmitting a start-up command after having transmitted a switching command causes, for example, switching of input terminals to be executed, with the result that the display screen may black out for a moment. On the other hand, even in a case where the start-up of the software application is slow, transmitting a start-up command after having transmitted a switching command reduces the likelihood of occurrence of a malfunction in which the display screen blacks out for a moment.

It is preferable that a switching command be transmitted after a predetermined period of time has elapsed since a start-up command was transmitted. This further reduces the likelihood of occurrence of a malfunction in which the display screen blacks out for a moment. It is more preferable that transmission of a switching command be executed after a time required to start the application software has elapsed. This makes it possible to prevent a malfunction in which the display screen blacks out for a moment.

Figure 17:
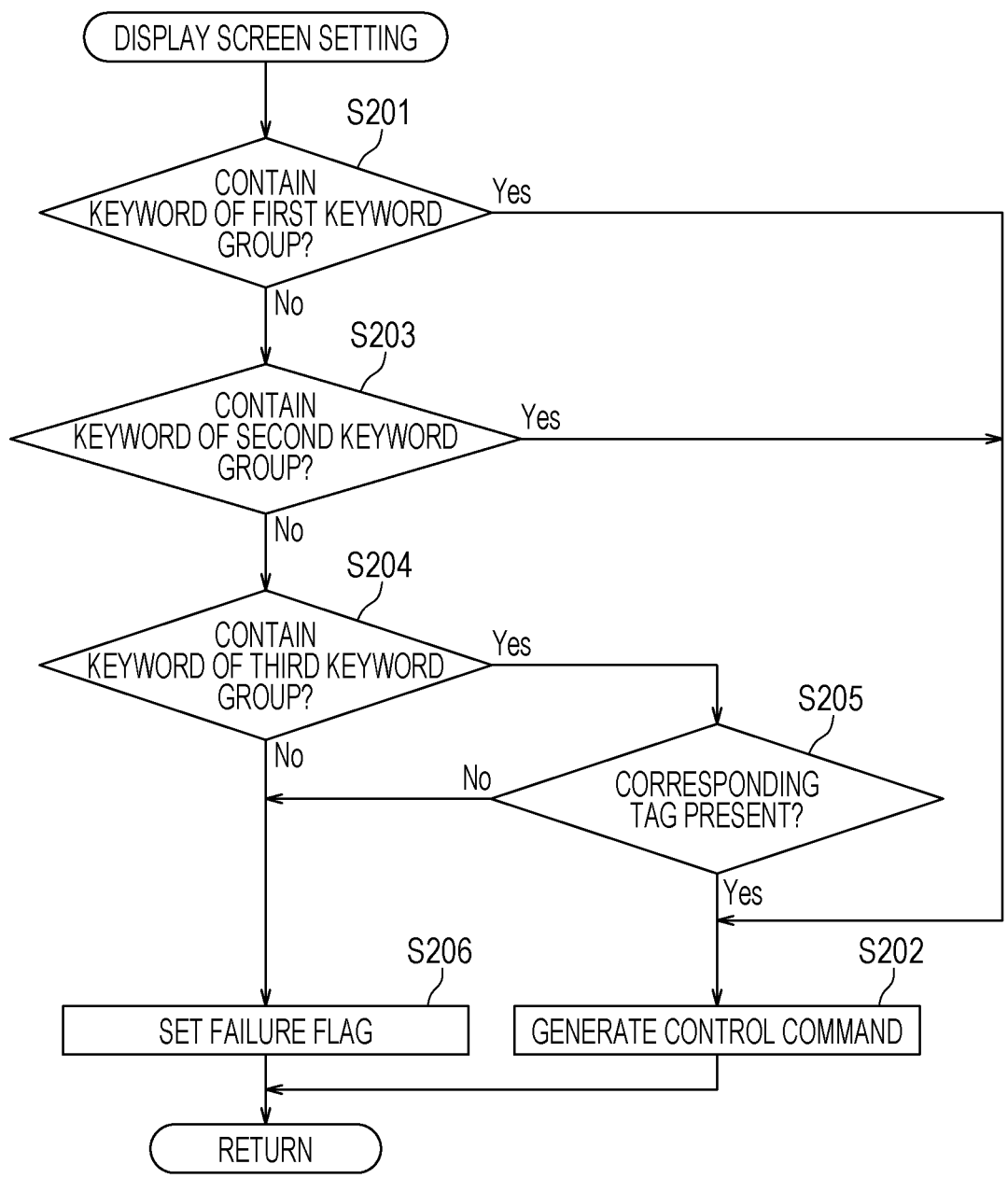
FIG. 17 is a diagram showing a display screen setting process according to Embodiment 1 of the present disclosure.

Next, a display screen setting process (step S23 of FIG. 13) is described with reference to FIGS. 1 and 2, FIGS. 7A to 11, and FIG. 17. FIG. 17 is a diagram showing a display screen setting process according to Embodiment 1.

As shown in FIG. 17, having acquired the recognition result text, the controller 24 of the meeting support server 2 determines whether the recognition result text contains a keyword of the first keyword group 233 (step S201). In particular, the controller 24 of the meeting support server 2 determines whether the recognition result text contains the keyword "first terminal", the keyword "second terminal", or the keyword "third terminal".

In a case where the controller 24 of the meeting support server 2 has determined that the recognition result text contains a keyword of the first keyword group 233 (step S201; Yes), the controller 24 of the meeting support server 2 generates a control command with reference to the first management table 231 (step S202). For example, in a case where the recognition result text contains the keyword "first terminal), the controller 24 of the meeting support server 2 searches the first management table 231 for the second tag "first terminal" and the first tag "first input terminal", which corresponds to the second tag "first terminal". Then, the controller 24 of the meeting support server 2 generates a switching command (first switching command) to activate the first input terminal 81. Having generated the control command, the controller 24 of the meeting support server 2 returns to the process of FIG. 13.

In a case where the controller 24 of the meeting support server 2 has determined that the recognition result text does not contain a keyword of the first keyword group 233 (step S201; No), the controller 24 of the meeting support server 2 determines whether the recognition result text contains a keyword of the second keyword group 234 (step S203). In other words, the controller 24 of the meeting support server 2 determines whether the recognition result text contains a keyword that takes the display apparatus 8 back to the last display screen it displayed.

In a case where the controller 24 of the meeting support server 2 has determined that the recognition result text contains a keyword of the second keyword group 234 (step S203; Yes), the controller 24 of the meeting support server 2 generates a control command with reference to the second management table 236 (step S202). For example, in a case where the first tag "first input terminal" is in the "last display" column 711 of the second management table 236, the controller 24 of the meeting support server 2 generates a switching command (first switching command) to activate the first input terminal 81. Having generated the control command, the controller 24 of the meeting support server 2 returns to the process of FIG. 13.

In a case where the controller 24 of the meeting support server 2 has determined that the recognition result text does not contain a keyword of the second keyword group 234 (step S203; No), the controller 24 of the meeting support server 2 determines whether the recognition result text contains a keyword of the third keyword group 235 (step S204). In other words, the controller 24 of the meeting support server 2 determines whether the recognition result text contains a keyword that indicates application software and a keyword that gives an instruction to start the application software.

In a case where the controller 24 of the meeting support server 2 has determined that the recognition result text contains a keyword of the third keyword group 235 (step S204; Yes), the controller 24 of the meeting support server 2 determines whether a user label tag (hereinafter sometimes referred to as "target tag") that corresponds to the keyword contained in the recognition result text is present in the second tag column 703 of the first management table 231 and the user label tag column 707 of the application table 232 (step S205). In particular, the controller 24 of the meeting support server 2 searches the user label tag column 707 of each application table 232 ("application table 1" to "application table 3") with reference to the application information column 704 of the first management table 231. Further, in a case where the target tag is not present in the user label tag column 707, the controller 24 of the meeting support server 2 determines whether the target tag is present in the second tag column 703 of the first management table 231.

In a case where the controller 24 of the meeting support server 2 has determined that the target tag is present (step S205; Yes), the controller 24 of the meeting support server 2 generates a control command with reference to the first management table 231 and the application table 232 (step S202). Having generated the control command, the controller 24 of the meeting support server 2 returns to the process of FIG. 13.

For example, in a case where the target tag is present in the user label tag column 707 of the "application table 1", the controller 24 of the meeting support server 2 generates a start-up command with reference to the start-up command set in the "application table 1". Further, the controller 24 of the meeting support server 2 searches for the first tag "first input terminal" from the row of the first management table 231 including the "application table 1". Then, the controller 24 of the meeting support server 2 generates a switching command (first switching command) to activate the first input terminal 81.

Further, for example, in a case where the target tag is present in the second tag column 703 of the first management table 231, the controller 24 of the meeting support server 2 generates a second switching command. Further, the controller 24 of the meeting support server 2 generates a start-up command using the application information (application name) included in the row in which the target tag is present.

In a case where the controller 24 of the meeting support server 2 has determined that the recognition result text does not contain a keyword of the third keyword group 235 (step S204; No), the controller 24 of the meeting support server 2 sets a flag that indicates that the controller 24 of the meeting support server 2 has failed in setting a display screen (step S206), and then returns to the process shown in FIG. 13. Further, in a case where the controller 24 of the meeting support server 2 has determined that the target tag is not present (step S205; No), the controller 24 of the meeting support server 2 sets a flag that indicates that the controller 24 of the meeting support server 2 has failed in setting a display screen (step S206), and returns to the process shown in FIG. 13.

Embodiment 2

Next, Embodiment 2 of the present disclosure is described with reference to FIG. 1 and FIGS. 18 to 23. Note, however, that matters differing from those of Embodiment 1 are described and a description of matters identical to those of Embodiment 1 is omitted. Embodiment 2 differs from Embodiment 1 in that when a user vocalizes the file name of a data file currently processed by the application software installed on the first to third terminal apparatuses 4 to 6, the display apparatus 8 displays the data file.

Figure 18:
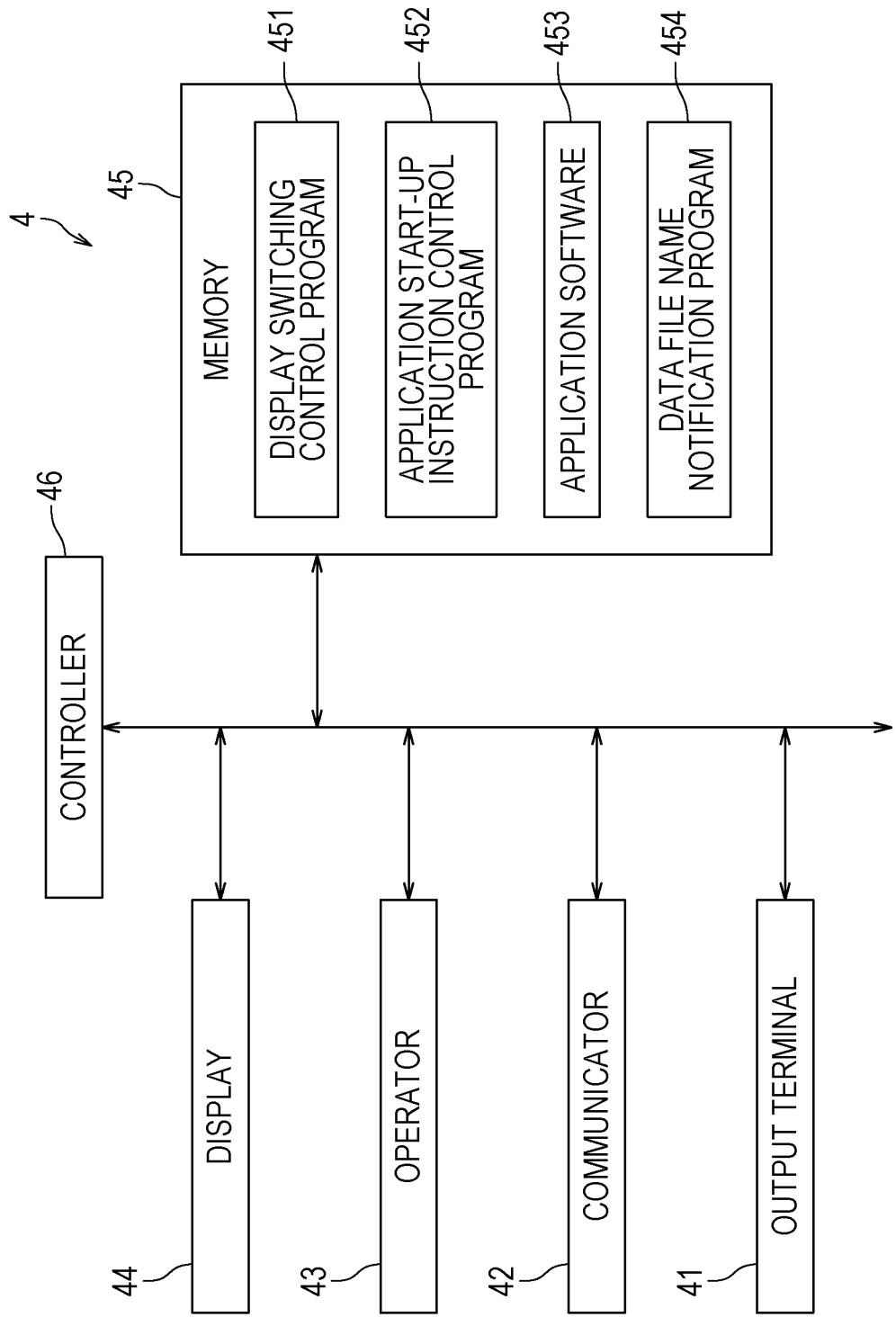
FIG. 18 is a diagram showing a configuration of a first terminal apparatus according to Embodiment 2 of the present disclosure.

First, a first terminal apparatus 4 (meeting room PC) of Embodiment 2 is described with reference to FIGS. 1 to 18. FIG. 18 is a diagram showing a configuration of the first terminal apparatus 4 according to Embodiment 2.

As shown in FIG. 18, the memory 45 of Embodiment 2 further has stored therein a data file name notification program 454. Further, the memory 45 has stored therein in association with each other a data file to be processed by the external application 453 and information indicating the file name of the data file. The information indicating the file name is hereinafter sometimes referred to as "file name information".

The controller 46 of Embodiment 2 executes the data file name notification program 454 to transmit, to the meeting support server 2 (FIG. 1), the file name information of a data file currently displayed by the display 44. In other words, the controller 46 transmits, to the meeting support server 2 (FIG. 1), the file name information of a data file currently opened by the external application 453.

More specifically, the controller 46 causes the communicator 42 to transmit the file name information of a data file being displayed on the foremost surface of the display 44. Accordingly, the controller 46 transmits the file name information to the meeting support server 2 (FIG. 1) when the foremost surface switches to displaying another data file.

For example, when the external application 453 opens the data file in response to the operation of the operator 43 by a user, the controller 46 causes the communicator 42 to transmit the file name information. Alternatively, when, in a case where the display 44 is displaying a plurality of data files, the foremost surface switches to displaying another data file in response to the operation of the operator 43 by a user, the controller 46 causes the communicator 42 to transmit the file name information. Alternatively, when, in a case where the display 44 is displaying a plurality of data files, the data file displayed on the foremost surface is closed in response to the operation of the operator 43 by a user, the controller 46 causes the communicator 42 to transmit the file name information. Alternatively, when a minimized data file is enlarged in response to the operation of the operator 43 by a user, the controller 46 causes the communicator 42 to transmit the file name information. When all data files displayed on the display 44 are closed in response to the operation of the operator 43 by a user, the controller 46 transmits, to the meeting support server 2 (FIG. 1), information indicating that no data file is being displayed.

Figure 19:
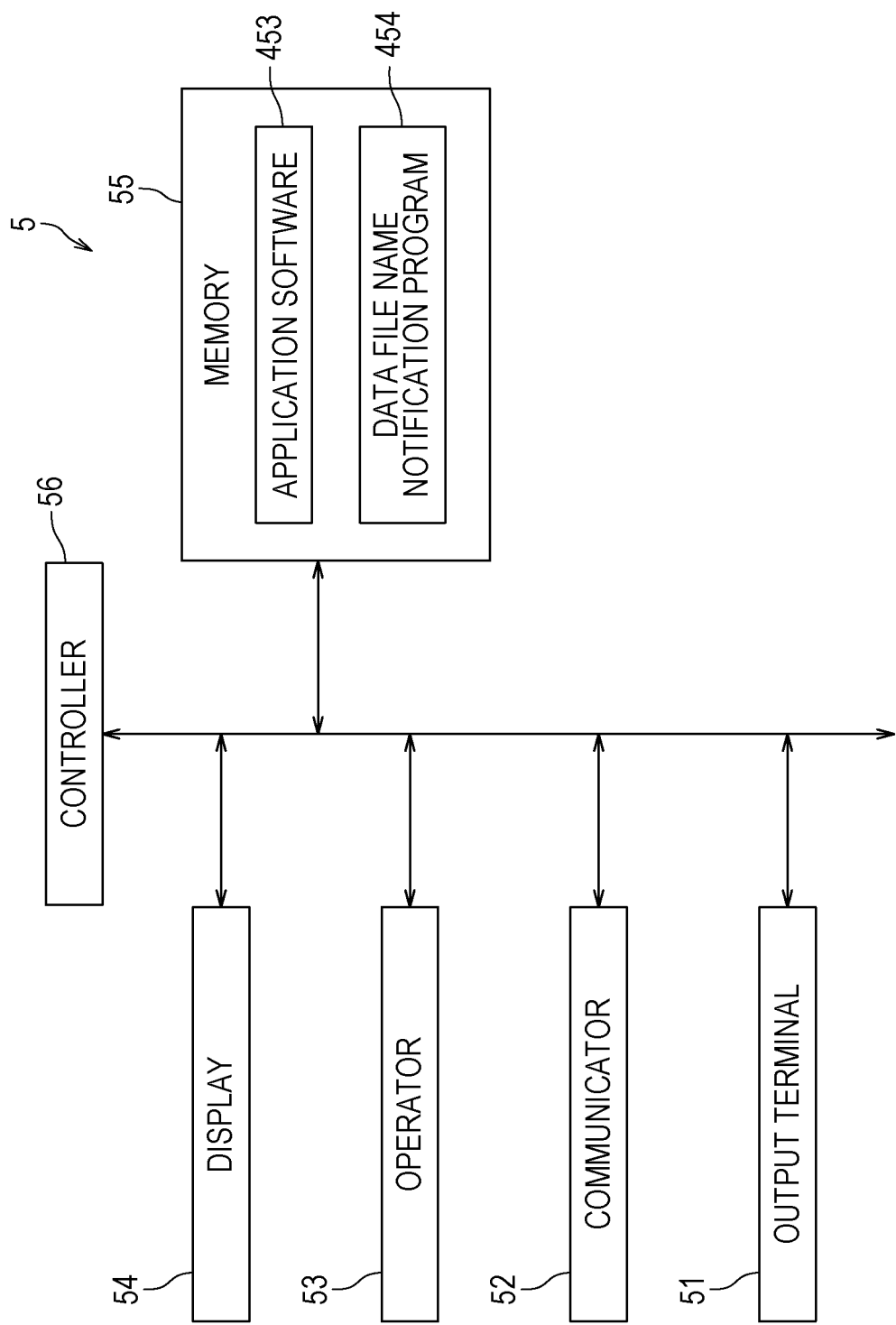
FIG. 19 is a diagram showing a configuration of a second terminal apparatus according to Embodiment 2 of the present disclosure.

Next, a second terminal apparatus 5 (guest PC) of Embodiment 2 is described with reference to FIGS. 1 and 19. FIG. 19 is a diagram showing a configuration of the second terminal apparatus 5 according to Embodiment 2. As shown in FIG. 19, the second terminal apparatus 5 includes an output terminal 51, a communicator 52, an operator 53, a display 54, a memory 55, and a controller 56.

The output terminal 51 outputs image information. The output terminal 51 is connected to the second input terminal 82 (FIG. 1) of the display apparatus 8. In a case where the second input terminal 82 (FIG. 1) of the display apparatus 8 is activated, image information outputted from the output terminal 51 is displayed by the display apparatus (FIG. 1).

The communicator 52 is connected to the LAN cable 10 (FIG. 1). The communicator 52 includes, for example, a LAN board or a LAN module. The communicator 52 controls communication with the meeting support server 2 (FIG. 1). Specifically, the communicator 52 transmits file name information to the meeting support server 2 (FIG. 1). Further, the communicator 52 transmits, to the meeting support server 2 (FIG. 1), information indicating that no data file is being displayed.

The operator 53 is operated by a user to receive an instruction from the user. The operator 53 outputs, to the controller 56, a signal corresponding to the user's operation. As a result, the second terminal apparatus 5 executes an action corresponding to the operation accepted by the operator 53. The operator 53 includes, for example, a pointing device and a keyboard. The operator 53 may also include a touch sensor. The touch sensor is stacked on a display surface of the display 54.

The display 54 displays various types of screen. In Embodiment 2, the display 54 displays a data file currently processed (currently opened) by an external application 453 installed on the second terminal apparatus 5. In other words, the display 54 displays a data file currently opened by the external application 453. An example of the display 54 is a liquid crystal display or an organic EL display. In a case where the touch sensor is stacked on the display surface of the display 54, the display 54 functions as a touch display.

The memory 55 includes, for example, semiconductor memories such as a RAM and a ROM. Furthermore, the memory 55 includes a storage device such as an HDD. The memory 55 has stored therein a control program that the controller 56 executes. Further, as in the case of the first terminal apparatus 4, the memory 55 has stored therein a data file to be processed by the external application 453, file name information, and a data file name notification program 454.

The controller 56 includes, for example, a processor such as a CPU. Further, the controller 56 (computer) controls, in accordance with the control program (computer program) stored in the memory 55, how the second terminal apparatus 5 operates.

In Embodiment 2, as with the controller 46 of the first terminal apparatus 4 described with reference to FIG. 18, the controller 56 executes the data file name notification program 454 to transmit, to the meeting support server 2 (FIG. 1), the file name information of a data file currently displayed by the display 54. Further, as with the controller 46 of the first terminal apparatus 4 described with reference to FIG. 18, the controller 56 executes the data file name notification program 454 to transmit, to the meeting support server 2 (FIG. 1), information indicating that no data file is being displayed.

The foregoing has described the second terminal apparatus 5 of Embodiment 2. A third terminal apparatus 6 of Embodiment 2 is identical in configuration to the second terminal apparatus 5 and, as such, is not described here.

Figure 20:
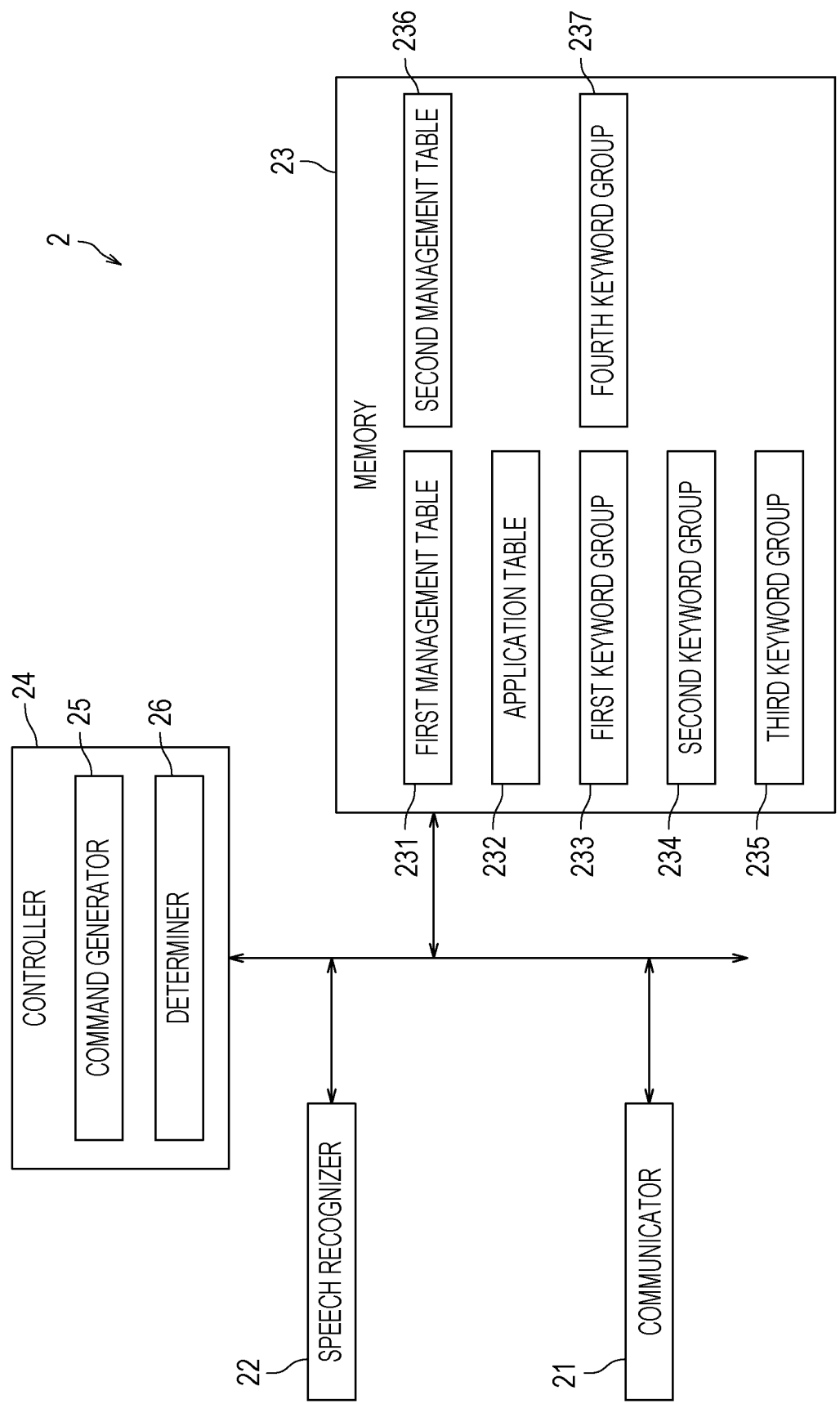
FIG. 20 is a diagram showing a configuration of a meeting support server according to Embodiment 2 of the present disclosure.

Next, a meeting support server 2 of Embodiment 2 is described with reference to FIGS. 1 and 20. FIG. 20 is a diagram showing a configuration of the meeting support server 2 according to Embodiment 2.

First, the communicator 21 is described. In Embodiment 2, the communicator 21 controls communication with the first to third terminal apparatuses 4 to 6 (FIG. 1) and the microphone/speaker apparatus 7 (FIG. 1). The communicator 21 of Embodiment 2 receives file name information from the first to third terminal apparatuses 4 to 6 (FIG. 1). Further, the communicator 21 receives, from the first to third terminal apparatuses 4 to 6 (FIG. 1), information indicating that no data file is being displayed.

Next, the memory 23 is described. As shown in FIG. 20, the memory 23 of Embodiment 2 further has stored therein a fourth keyword group 237 in addition to the first management table 231, the application table 232, the first keyword group 233, the second keyword group 234, the third keyword group 235, and the second management table 236.

The first management table 231 of Embodiment 2 differs from the first management table 231 described in Embodiment 1 in that the first management table 231 of Embodiment 2 associates the file names of data files currently displayed by the first to third terminal apparatuses 4 to 6 (FIG. 1), the apparatuses that are connected to the first to third input terminals 81 to 83 (FIG. 1), and the first to third input terminals 81 to 83 (FIG. 1) with one another. More specifically, the file names of data files being displayed on the foremost surfaces of the displays of the first to third terminal apparatuses 4 to 6 (FIG. 1), respectively, are registered in the first management table 231.

The fourth keyword group 237 includes keywords that indicate the file names of the data files currently displayed by the first to third terminal apparatuses 4 to 6 (FIG. 1). More specifically, the fourth keyword group 237 includes keywords that indicate the file names of the data files being displayed on the foremost surfaces of the displays of the first to third terminal apparatuses 4 to 6 (FIG. 1), respectively.

Next, the determiner 26 and the command generator 25 of Embodiment 2 are described. In Embodiment 2, the determiner 26 determines, with reference to the first to fourth keyword groups 233 to 237, whether a keyword contained in a recognition result text corresponds to a keyword that belongs to the first keyword group 233, a keyword that belongs to the second keyword group 234, a keyword that belongs to the third keyword group 235, or a keyword that belongs to the fourth keyword group 237. The command generator 25 executes any of the first to fourth control command generation processes or a fifth control command generation process according to a result of determination yielded by the determiner 26, description of the first to fourth control command generation processes, which have already been described in Embodiment 1, is omitted here. The fifth control command generation process is described below.

Fifth Control Command Generation Process

In a case where a recognition result text contains a keyword that indicates a file name, the command generator 25 identifies which of the first to third input terminals 81 to 83 (FIG. 1) is associated with the file name.

In particular, the command generator 25 identifies, with reference to the first management table 231, the apparatus that corresponds to the keyword contained in the recognition result text. Furthermore, the command generator 25 identifies, with reference to the first management table 231, the input terminal associated with the apparatus thus identified.

Further, having identified the input terminal, the command generator 25 generates, as a control command, a first switching command to activate the input terminal thus identified. The control command (first switching command) is transmitted to the first terminal apparatus 4 (meeting room PC) described with reference to FIG. 1.

The foregoing has described Embodiment 2 with reference to FIG. 1 and FIGS. 18 to 20. Embodiment 2 makes it possible that in a case where a terminal apparatus (first to third terminal apparatuses 4 to 6) connected to the display apparatus 8 is installed with application software, image information that is generated by the application software can be displayed in accordance with a user's speech.

Specifically, when a user vocalizes the file name of a data file currently opened by the application software, the data file is displayed on the display apparatus 8. More specifically, when a user vocalizes the file name of a data file being displayed on the foremost surface of the display of a terminal apparatus connected to the display apparatus 8, the data file is displayed on the display apparatus 8. Embodiment 2 allows a user to, without identifying which terminal apparatus has stored therein the data file that the user would like the display apparatus 8 to display, cause the display apparatus 8 to display the desired data file. In other words, without having to know which terminal apparatus has stored therein the desired data file, the user can cause the display apparatus 8 to display the desired data file.

Next, the first management table 231 of Embodiment 2 is described with reference to FIGS. 1, 20, and 21. FIG. 21 is a diagram showing the first management table 231 according to Embodiment 2. As shown in FIG. 21, the first management table 231 of Embodiment 2 further includes a data file name column 712.

The data file name column 712 shows the file names of data files currently displayed by the displays of the apparatuses entered into the second tag column 703, respectively. Specifically, the data file name column 712 shows the file names of data files being displayed on the foremost surfaces of the displays of the apparatuses, respectively.

In particular, the controller 24 (FIG. 20) of the meeting support server 2 registers file names in the data file name column 712 on the basis of file name information that is received from the first to third terminal apparatuses 4 to 6 (FIG. 1). In other words, the controller (FIG. 20) of the meeting support server 2 updates the data file name column 712 on the basis of file name information that is received from the first to third terminal apparatuses 4 to 6 (FIG. 1). Further, upon receiving, from an apparatus, information indicating that no data file is being displayed, the controller 24 (FIG. 20) of the meeting support server 2 enters "Null" into a field of the data file name column 712 that corresponds to the apparatus. Although FIG. 21 illustrates file names with extensions, the extensions may be omitted.

Figure 22:
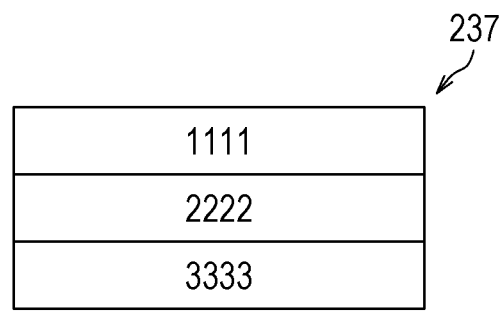
FIG. 22 is a diagram showing a fourth keyword group according to Embodiment 2 of the present disclosure.

Next, the fourth keyword group 237 is described with reference to FIG. 1 and FIGS. 20 to 22. FIG. 22 is a diagram showing the fourth keyword group 237 according to Embodiment 2. The fourth keyword group 237 includes keywords that indicate the file names of data files currently displayed by the respective displays of the first to third terminal apparatuses 4 to 6 (FIG. 1). Specifically, the fourth keyword group 237 includes keywords that indicate the file names of data files being displayed on the foremost surfaces of the displays.

In particular, the controller 24 (FIG. 20) of the meeting support server 2 creates the fourth keyword group 237 on the basis of information entered into the data file name column 712 described with reference to FIG. 21. In other words, the controller 24 (FIG. 20) of the meeting support server 2 updates the fourth keyword group 237 upon updating the data file name column 712. Although FIG. 22 illustrates keywords without extensions, keywords with extensions may be created.

Figure 23:
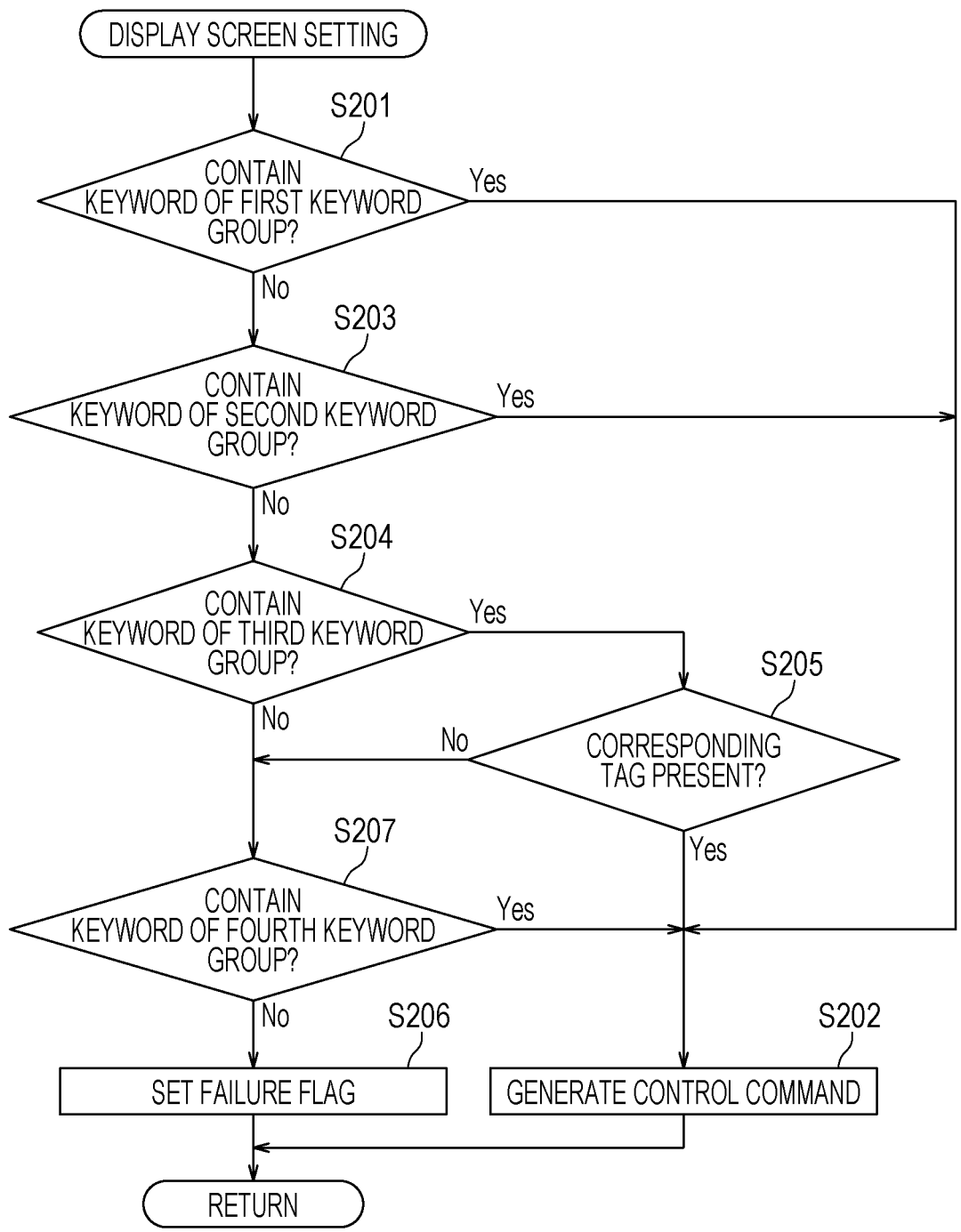
FIG. 23 is a diagram showing a display screen setting process according to Embodiment 2 of the present disclosure.

Next, a display screen setting process (step S23 of FIG. 13) of Embodiment 2 is described with reference to FIGS. 20 to 23. FIG. 23 is a diagram showing a display screen setting process according to Embodiment 2. The process shown in FIG. 23 differs from the display screen setting process shown in FIG. 17 in that the process shown in FIG. 23 includes step S207.

In a case where the controller 24 of the meeting support server 2 has determined that the recognition result text does not contain a keyword of the third keyword group 235 (step S204; No), the controller 24 of the meeting support server 2 determines whether the recognition result text contains a keyword of the fourth keyword group 237 (step S207). In other words, the controller 24 of the meeting support server 2 determines whether the recognition result text contains a keyword that indicates a file name.

In a case where the controller 24 of the meeting support server 2 has determined that the recognition result text contains a keyword of the fourth keyword group 237 (step S207; Yes), the controller 24 of the meeting support server 2 generates a control command with reference to the first management table 231 (step S202). For example, in a case where the recognition result text contains the keyword "1111" (FIG. 22), the controller 24 of the meeting support server 2 searches the data file name column 712 (FIG. 21) for a file name that includes the keyword "1111". Then, the controller 24 of the meeting support server 2 generates a switching command (first switching command) to activate the first input terminal 81. Having generated the control command, the controller 24 of the meeting support server 2 returns to the process of FIG. 13.

In a case where the controller 24 of the meeting support server 2 has determined that the recognition result text does not contain a keyword of the fourth keyword group 237 (step S207; No), the controller 24 of the meeting support server 2 sets a flag that indicates that the controller 24 of the meeting support server 2 has failed in setting a display screen (step S206), and then returns to the process shown in FIG. 13.

The foregoing has described Embodiment 2 of the present disclosure with reference to FIG. 1 and FIGS. 18 to 23. Although, in Embodiment 2, the memory 23 of the meeting support server 2 has stored therein a table (first management table 231) that associates input terminals, apparatuses connected to the input terminals, and file names with one another, the memory 23 of the meeting support server 2 may alternatively have file names and input terminals stored therein in association with each other. Further, although Embodiment 2 causes the display apparatus 8 to display a data file currently opened by an external application 453, the data file that the display apparatus 8 is caused to display is not limited to a data file currently opened by an external application 453, provided it is a data file being displayed by an apparatus connected to the display apparatus 8.

The foregoing has described embodiments of the present disclosure with reference to the drawings. Note, however, that the present disclosure is not limited to the embodiments described above but may be embodied in various aspects without departing from the scope of the present disclosure.

For example, the display apparatus 8 may display an image that notifies a user which input terminal has been activated in accordance with the user's speech. An image that notifies a user of an activated input terminal shows, for example, the name (such as "D-SUB terminal", "HDMI (registered trademark) terminal", or "DisplayPort") of the activated input terminal. Alternatively, the display apparatus 8 may display an image that notifies a user which terminal apparatus is connected to an input terminal activated in accordance with the user's speech. An image that notifies a user which terminal apparatus is connected to an activated input terminal shows, for example, the name (such as "first terminal" or "second terminal") of the terminal apparatus.

Further, although the embodiments of the present disclosure have described the meeting system 1, the present disclosure may be applied to any system that includes a display apparatus. For example, the present disclosure may be applied to a lecture system that is used in a juku or a school and a display system that is used at home.

Further, although the embodiments of the present disclosure use the microphone/speaker apparatus 7, the first terminal apparatus 4 (meeting room PC) or the display apparatus 8 may alternatively have the function of the microphone/speaker apparatus 7.

Further, although the embodiments of the present disclosure have described a configuration in which the meeting support server 2 supports the display apparatus 8 in switching from one display screen to another, the meeting support server 2 may also support the display apparatus 8 in volume control. For example, the memory 23 of the meeting support server 2 may have stored therein a keyword group associated with volume such as "volume", "turn down", and "turn up". By the memory 23 of the meeting support server 2 having stored therein the keyword group associated with volume, volume can be controlled according to a user's speech.

Further, although, in the embodiments of the present disclosure, the controller 24 (command generator 25) of the meeting support server 2 generates a start-up command (first start-up command) using an application name, a user may alternatively operate the operator 43 of the first terminal apparatus 4 to register a start-up command.

Further, although the embodiments of the present disclosure use the meeting support server 2 as an operational support apparatus, the first terminal apparatus (meeting room PC) or the display apparatus 8 may alternatively be used as an operational support apparatus.

Further, although, in the embodiments of the present disclosure, the first terminal apparatus 4 transmits, to the first to third terminal apparatuses 4 to 6 and the display apparatus 8, a control command transmitted from the meeting support server 2, the meeting support server 2 may alternatively transmit a control command to the first to third terminal apparatuses 4 to 6 and the display apparatus 8.

Further, although, in the embodiments of the present disclosure, the display apparatus 8 includes three input terminals (first to third input terminals 81 to 83), the number of input terminals that the display apparatus 8 includes is not limited to 3, but the display apparatus 8 needs only include a plurality of input terminals.

Further, although the embodiments of the present disclosure uses, in order to acquire a user's speech, an apparatus (microphone/speaker apparatus 7) including a function of collecting sounds of speech and a function of outputting sounds of speech, an apparatus including only the function of collecting sounds of speech of the function of collecting sounds of speech and the function of outputting sounds of speech may alternatively be used.

Further, although, in the embodiments of the present disclosure, the memory 23 of the meeting support server 2 has stored therein a table (first management table 231) that associates input terminals, apparatuses connected to the input terminals, and external applications with one another, the memory 23 of the meeting support server 2 may alternatively have stored therein a table that associates external applications and input terminals directly with each other.

Further, although, in the embodiments of the present disclosure, the display apparatus 8 activates one input terminal, the display apparatus 8 may alternatively activate two input terminals at a time. Specifically, as shown in FIG. 24, the display apparatus 8 may simultaneously display a main screen 181 and a subscreen 182 that is smaller in screen size than the main screen 181.

Figure 24:
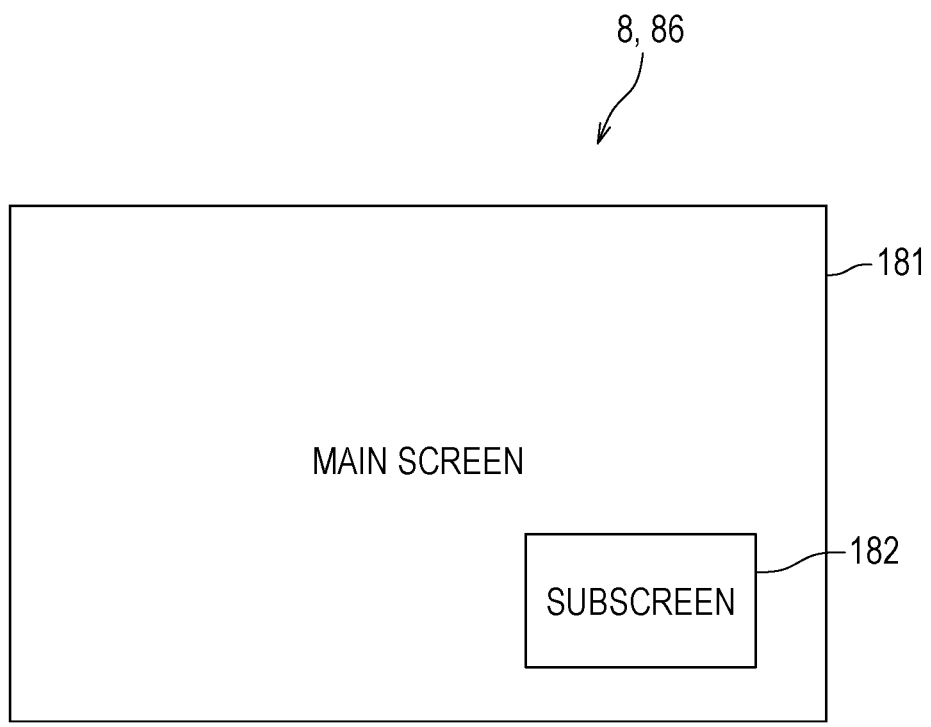
FIG. 24 is a diagram showing a main screen and a subscreen according to another embodiment of the present disclosure.

Further, in a case where, as shown in FIG. 24, the main screen 181 and the subscreen 182 are simultaneously displayed, a control command to change at least either first image information being displayed on the main screen 181 or second image information being displayed on the subscreen 182 can be generated by the storage 23 of the meeting support server 2 further having stored therein a group of keywords such as "swapping", "main", and "sub".

For example, in a case where the keyword "swapping" is contained in a recognition result text in a state where image information received by the first input terminal 81 is being displayed on the main screen 181 and image information received by the second input terminal 82 is being displayed on the subscreen 182, the command generator 25 can generate a control command to cause the subscreen 182 to display the image information received by the first input terminal 81 and cause the main screen 181 to display the image information received by the second input terminal 82.

Further, for example, in a case where the keyword "main" and the keyword "third terminal" are contained in a recognition result text in a state where image information received by the first input terminal 81 is being displayed on the main screen 181 and image information received by the second input terminal 82 is being displayed on the subscreen 182, the command generator 25 can generate a control command to cause the main screen 181 to display image information received by the third input terminal 83.

The present disclosure is applicable to systems, such as meeting systems, lecture systems, lesson systems, in which display apparatuses are used.

The present disclosure contains subject matter related to that disclosed in Japanese Priority Patent Application JP 2017-253528 filed in the Japan Patent Office on Dec. 28, 2017 and Japanese Priority Patent Application JP 2018-101537 filed in the Japan Patent Office on May 28, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An operational support apparatus for supporting operation of a display apparatus, the display apparatus including a plurality of input terminals that each receive image information and a display section that displays image information received by an activated input terminal of the plurality of input terminals from an apparatus connected to the activated input terminal, comprising:
   a speech recognizer that converts speech data into text information; and
   a command generator that generates a control command that corresponds to a content of the text information,
   wherein in a case where the text information contains a keyword that indicates first application software, the command generator determines which of the plurality of input terminals of the display apparatus is associated with the first application software,
   the command generator generates, as the control command, a switching command to activate the input terminal thus determined and a start-up command to start the first application software associated with the input terminal thus determined,
   the command generator identifies a certain input terminal of the input terminals of the display apparatus according to a keyword that indicates first application software associated with the certain input terminal, and identifies a certain different input terminal of the input terminals of the display apparatus according to a keyword indicating first application software associated with the certain different input terminal, and
   first application software associated with an input terminal of the input terminals activated by the switching command is installed on an apparatus connected to the input terminal activated by the switching command,
   after the first application software associated with the input terminal activated by the switching command is started by the start-up command, the apparatus connected to the input terminal activated by the switching command transmits image information generated by the first application software associated with the input terminal activated by the switching command to the input terminal activated by the switching command.

2. The operational support apparatus according to claim 1, wherein the command generator generates the switching command after having transmitted the start-up command.

3. The operational support apparatus according to claim 1, further comprising a memory having stored therein a name arbitrarily set by a user for the first application software,
   wherein in a case where the text information contains the name, the command generator identifies the input terminal associated with the first application software that corresponds to the name from among the input terminals of the display apparatus.

4. The operational support apparatus according to claim 1, further comprising a memory having stored therein history information indicating a history of display screens that the display apparatus displayed,
   wherein in a case where the text information contains a keyword that takes the display apparatus back to a last display screen the display apparatus displayed, the command generator generates the control command to cause the display apparatus to display the last display screen.

5. The operational support apparatus according to claim 1, further comprising a memory having a file name of a data file and one input terminal stored therein in association with each other, the one input terminal being one of the plurality of input terminals of the display apparatus,
   wherein in a case where the text information contains a keyword that indicates the file name, the command generator determines which of the plurality of input terminals of the display apparatus is associated with the file name, and generates the switching command.

6. The operational support apparatus according to claim 5, wherein the data file is a data file currently processed by the first application software.

7. The operational support apparatus according to claim 5, wherein the data file is a data file being displayed by an apparatus connected to an input terminal determined as the input terminal associated with the first application software.

8. The operational support apparatus according to claim 1, further comprising a memory having stored therein a management table that associates an apparatus connected to one input terminal of the input terminals of the display apparatus, the first application software installed on the apparatus connected to the one input terminal, and the one input terminal to which the apparatus is connected with one another,
   wherein in a case where the text information contains a keyword indicating the first application software installed on the apparatus connected to the one input terminal, the command generator identifies, with reference to the management table, the apparatus installed with the first application software, and
   the command generator identifies, with reference to the management table, the one input terminal to which the apparatus thus identified is connected from among the plurality of input terminals of the display apparatus.

9. The operational support apparatus according to claim 1, further comprising a determiner that determines whether the text information contains a keyword that indicates the first application software or a keyword that indicates an apparatus connected to one input terminal of the plurality of input terminals of the display apparatus,
   wherein in a case where the text information contains a keyword that indicates the first application software, the command generator generates the switching command and the start-up command as the control command, and
   in a case where the text information contains a keyword that indicates the apparatus connected to the one input terminal of the plurality of input terminals of the display apparatus, the command generator determines which of the plurality of input terminals of the display apparatus the apparatus is connected to, and the command generator generates, as the control command, the switching command to activate the input terminal thus determined that is the one input terminal to which the apparatus connected to the one input terminal is connected.

10. The operational support apparatus according to claim 1, wherein in a case where the text information contains a keyword that indicates the second application software installed on the display apparatus, the command generator generates, as the control command, the start-up command to start the second application software.

11. The operational support apparatus according to claim 1, wherein the display apparatus displays a main screen and a sub screen that is smaller in screen size than the main screen, and in a case where the text information contains a keyword that changes at least either first image information being displayed on the main screen or second image information being displayed on the sub screen, the command generator generates, according to the keyword, the control command to change at least either the first image information or the second image information.

12. An operational support system comprising:

a display apparatus; and an operational support apparatus for supporting operation of the display apparatus, wherein the display apparatus includes:

a plurality of input terminals that each receives image information, and a display section that displays image information received by an activated input terminal of the plurality of input terminals from an apparatus connected to the activated input terminal, the operational support apparatus includes:

a speech recognizer that converts speech data into text information, and a command generator that generates a control command that corresponds to a content of the text information, in a case where the text information contains a keyword that indicates application software, the command generator determines which of the plurality of input terminals of the display apparatus is associated with the application software, the command generator generates, as the control command, a switching command to activate the input terminal thus determined and a start-up command to start the application software associated with the input terminal thus determined, the command generator identifies a certain input terminal of the input terminals of the display apparatus according to a keyword that indicates application software associated with the certain input terminal, and identifies a certain different input terminal of the input terminals of the display apparatus according to a keyword indicating application software associated with the certain different input terminal, the application software associated with an input terminal of the input terminals activated by the switching command is installed on an apparatus connected to the input terminal activated by the switching command, after the application software associated with the input terminal activated by the switching command is started by the start-up command, the apparatus connected to the input terminal activated by the switching command transmits image information generated by the application software thus started to the input terminal activated by the switching command, and the display section displays the image information received by the input terminal of the plurality of input terminals of the display apparatus that is activated by the switching command from the apparatus installed with the application software associated with the input terminal thus activated.

13. An operational support method for supporting operation of a display apparatus, the display apparatus including a plurality of input terminals that each receives image information and a display section that displays image information received by an activated input terminal of the plurality of input terminals from an apparatus connected to the activated input terminal, comprising:

recognizing speech whose speech data is converted into text information;

generating a control command that corresponds to a content of the text information; and displaying image information received by the activated input terminal, wherein the generating the command includes in a case where the text information contains a keyword that indicates application software, determining which of the plurality of input terminals of the display apparatus is associated with the application software, and generating, as the control command, a switching command to activate the input terminal thus determined and a start-up command to start the application software associated with the input terminal thus determined, in the determining, a certain input terminal of the input terminals of the display apparatus is identified according to a keyword that indicates application software associated with the certain input terminal, and a certain different input terminal of the input terminals of the display apparatus is identified according to a keyword that indicates application software associated with the certain different input terminal, application software associated with an input terminal of the input terminals activated by the switching command is installed on an apparatus connected to the input terminals activated by the switching command, after the application software associated with the input terminal activated by the switching command is started by the start-up command, the apparatus connected to the input terminal activated by the switching command transmits image information generated by the application software associated with the input terminal activated by the switching command to the input terminal activated by the switching command, and the displaying includes displaying, on the display section, image information received by the input terminal activated by the switching command from the apparatus installed with the application software associated with the input terminal activated by the switching command.

* * * * *